(12) United States Patent
Wu et al.

(10) Patent No.: US 12,488,553 B2
(45) Date of Patent: Dec. 2, 2025

(54) PHOTONIC-CONTROLLED CROSSBAR FOR CONVOLUTION OPERATIONS IN NEUROMORPHIC MACHINE VISION

(71) Applicants: Yimin Wu, Waterloo (CA); Tao Guo, Stittsville (CA); Baizhou Zhang, Kitchener (CA); Y. Norman Zhou, Waterloo (CA)

(72) Inventors: Yimin Wu, Waterloo (CA); Tao Guo, Stittsville (CA); Baizhou Zhang, Kitchener (CA); Y. Norman Zhou, Waterloo (CA)

( * ) Notice: Subject to any disclaimer, the term of this patent is extended or adjusted under 35 U.S.C. 154(b) by 100 days.

(21) Appl. No.: 18/618,139

(22) Filed: Mar. 27, 2024

(65) Prior Publication Data

US 2024/0331334 A1    Oct. 3, 2024

Related U.S. Application Data

(60) Provisional application No. 63/577,017, filed on Mar. 28, 2023.

(51) Int. Cl.
*G06V 10/143* (2022.01)
*G06V 10/94* (2022.01)
*H04N 25/10* (2023.01)

(52) U.S. Cl.
CPC .......... *G06V 10/143* (2022.01); *G06V 10/955* (2022.01); *H04N 25/10* (2023.01)

(58) Field of Classification Search
CPC ..... G06V 10/143; G06V 10/955; H04N 25/10
USPC ........................................................ 348/272
See application file for complete search history.

(56) References Cited

U.S. PATENT DOCUMENTS

2021/0303983 A1* 9/2021 Abel .................. G02F 1/19

OTHER PUBLICATIONS

Chang, C., Chen, P., Chou, T., Wang, I., Hudec, B., Chang, C., Tsai, C., Chang, T., and Hou, T., "Mitigating Asymmetric Nonlinear Weight Update Effects in Hardware Neural Network Based on Analog Resistive Synapse", IEEE Journal on Emerging and Selected Topics in Circuits and Systems, vol. 8, No. 1, Mar. 2018, 116-124. 10.1109/JETCAS.2017.2771529.

(Continued)

*Primary Examiner* — Joel W Fosselman
(74) *Attorney, Agent, or Firm* — Shin Hung; VanTek IP LLP

(57) ABSTRACT

An optical synapse device which can be used in a neuromorphic machine vision system to enable broadband sensing and fast data processing in applications where machine vision is used, such as for example in real-time video analysis, autonomous vehicles and medical diagnosis. The novel optical synapse device enables image sensing, convolutional processing, and computing. Multiple synaptic plasticity triggered by photons can implement photonic computing and information transmission. Convolutional processing is realized by ultra-low energy kernel generators fully controlled by photons. The optical synapse device shows the ability of conductance modulations under electronic stimulations that implement neuromorphic computing. The novel two-terminal broadband optoelectronic synapse device enables front-end retinomorphic image sensing, convolutional processing, and back-end neuromorphic computing.

21 Claims, 16 Drawing Sheets

(56) References Cited

OTHER PUBLICATIONS

Li, S., Pam, M., Li, Y., Chen, L., Chien, Y., Fong, X., Chi, D., and Ang, K. (2022). "Wafer-Scale 2D Hafnium Diselenide Based Memristor Crossbar Array for Energy-Efficient Neural Network Hardware", Advanced Materials 34, 2103376. 10.1002/adma.202103376.

Pi, L., Wang, P., Liang, S.-J., Luo, P., Wang, H., Li, D., Li, Z., Chen, P., Zhou, X., Miao, F., et al. "Broadband convolutional processing using band-alignment-tunable heterostructures", Nat Electron, vol. 5, Apr. 2022, 248-254. 10.1038/s41928-022-00747-5.

Tian, Jing, Hou-Ji Zhou, Han Bao, Jia Chen, Xiao-Di Huang, Jian-Cong Li, Ling Yang, Yi Li, and Xiang-Shui Miao. "Memristive Fast-Canny Operation for Edge Detection", IEEE Transactions on Electron Devices, vol. 69, No. 11, Nov. 2022: 6043-6048.

Van Nguyen, H., Patel, V.M., Nasrabadi, N.M., and Chellappa, R. "Design of Non-Linear Kernel Dictionaries for Object Recognition", IEEE Transactions on Image Processing, vol. 22, No. 12, Dec. 2013, 5123-5135. 10.1109/TIP.2013.2282078.

Wang, C.-Y., Liang, S.-J., Wang, S., Wang, P., Li, Z., Wang, Z., Gao, A., Pan, C., Liu, C., Liu, J., et al. "Gate-tunable van der Waals heterostructure for reconfigurable neural network vision sensor", Sci. Adv. 6, eaba6173. Jun. 24, 2020, 10.1126/sciadv.aba6173.

Xia, Q., and Yang, J.J. "Memristive crossbar arrays for brain-inspired computing", Nat. Mater. vol. 18, Apr. 2019, 309-323. 10.1038/s41563-019-0291-x.

Yakopcic, Chris, Md Zahangir Alom, and Tarek M. Taha. "Memristor crossbar deep network implementation based on a convolutional neural network" In 2016 International joint conference on neural networks (IJCNN), pp. 963-970. IEEE, 2016.

\* cited by examiner

PHOTONIC-CONTROLLED CROSSBAR FOR CONVOLUTION OPERATIONS IN NEUROMORPHIC MACHINE VISION

CROSS-REFERENCE TO RELATED APPLICATIONS

This application claims the benefit of priority of U.S. Provisional Patent Application No. 63/577,017 filed on Mar. 28, 2023, which is hereby incorporated by reference.

FIELD

The present disclosure relates generally to machine vision systems. More particularly, the present disclosure relates to an optical synapse usable in machine vision systems.

BACKGROUND OF THE INVENTION

Many autonomous machines operating in real-world settings require machine vision systems for capturing images of its surroundings and methods for processing the captured images in order to perform their intended functions. A very well-known example includes autonomous vehicles which provide various levels of control over the vehicle based on sensed data of its environment as it travels along streets and roads, and must interact with real world objects and rules. Such sensed data is typically provided by a machine vision system used to help detect various objects in its immediate or surrounding environment, for the purposes of making algorithmic decisions on how to control the vehicle appropriately. Other applications include artificial intelligence, medical image diagnosis, criminal detection or privacy safety protection. A common aspect of these applications is the necessity to determine, contextually for the application, what an object is detected as being.

Known methods for providing machine vision are based on traditional computing systems based on the classical von Neumann architecture, where separate distinct hardware components are responsible for shuttling data between different units and executing particular functions. For example, conventional machine vision systems include an integrated photoreceptive array, an analog-to-digital converter system, a memory unit, and a processing unit, all of which are needed to complete sensing, image processing and recognition algorithms. The physical separation of those units causes sensing data redundancy, data access delay, frequent date shuttling, and high energy consumption. Multiple components make the traditional machine vision system bulky with high fabrication costs. These problems are exacerbated in the all-electric autonomous vehicle application, where due to the limited computing power of the vehicle, data must be shuttled wirelessly to a central processing system for processing, while preserving a finite onboard battery supply.

The Von Neumann bottleneck and the difficulty of further shrinking device sizes that limits integration, requires a comprehensive reconsideration of chip technologies—ranging from fundamental physics, materials science, device design, electronic circuits, and architectures.

Neuromorphic machine vision is an emerging solution enabling both sensing and processing on-site, which can significantly improve processing efficiency by avoiding frequent data shuttling. Current neuromorphic machine vision systems attempt to emulate the human visual system. A simplified image processing hierarchy in the human eye is shown in FIG. 1. The light goes through the cornea 10 and is projected on the innermost layer of the eyeball structure called the retina 12. High-density photoreceptive cells on the membrane of the retina can detect the photons and respond by generating neural spikes. The image pre-procession in the retina is vital for high-level object recognition, location, tracing, and so on. Particularly, the color of the object carries important information, which requires color-sensitive photoreceptors to detect light rays with different wavelengths. After being preprocessed appropriately (filtered, reflected, and refracted), the received image is transformed into the visual cortex 14 of the brain via optic nerves, where the image is processed into vision information.

A neuromorphic vision system which can emulate these functions requires artificial optoelectronic synapses that can complete multi-spectrum sensing and computational tasks. One such computational task includes convolution image processing, which is an essential step for convolutional neural works (CNNs) that is considered one of the most powerful deep learning algorithms.

Presently, memristive-based optical devices can sense photonic signals and show memory functions, and as such are suitable devices to function as an optoelectronic synapse to provide the above mentioned functions. Memristors have been arranged in crossbar arrays to implement convolution operations, but suffers from problems. Anything stored as conductance in the crossbar array, such as a kernel used for image processing, requires selectors to avoid sneaky currents during the programming processing in crossbar arrays, which will increase the fabrication costs and decrease integration density. Another issue is that the accuracy of the operation is highly influenced by the non-linearity of the I-V curve of memristors. The design assumes that the output currents responding to the pixel values are determined by the programmable conductance. However, the non-linearity I-V curve of memristors under different states is generally existent due to the barrier height induced by the heterojunction interface. Finally, to enrich the convolution operations by different kernels, a larger array is required, which translates into higher fabrication costs.

It is, therefore, desirable to provide a device suitable as an optoelectronic synapse for use in convolution operations. Such an optoelectronic synapse should also be usable for all the functions of front-end retinomorphic image sensing, convolutional processing and back-end neuromorphic computing for cognitive tasks.

SUMMARY OF THE INVENTION

It is an object of the present disclosure to obviate or mitigate at least one disadvantage of previous optoelectronic synapse devices and systems.

In a first aspect, the present disclosure provides a optical synapse device formed on a substrate. The optical synapse device includes a transparent electrically conductive film electrode, a double oxide active layer having resistive switching properties, and an electrically conductive layer. The transparent electrically conductive film electrode is configured to receive a voltage as an input. The double oxide active layer is positioned adjacent to and receives light passed through, the electrically conductive film electrode, and is configured to generate a current in response to the voltage and light passed through the electrically conductive film electrode. The electrically conductive layer is interposed between the double oxide active layer and the substrate to provide the current as an output.

According to an embodiment of the first aspect, the electrically conductive film electrode has at least 80% transmittance to light with a wavelength greater than 390 nm. This electrically conductive film electrode can be formed of indium tin oxide (ITO).

According to further embodiments of the first aspect, the double oxide active layer is sensitive to light of any wavelength below 620 nm, or the double oxide active layer is sensitive to green light, blue light and ultraviolet light. In this embodiment, the double oxide active layer can include a zinc oxide (ZnO) layer adjacent to the electrically conductive film electrode, and a molybdenum trioxide (MoO3) layer adjacent to the ZnO layer. The ZnO layer is configured to have a band gap between 3.10 eV to 3.44 eV, while the MoO3 layer is configured to have a band gap between 3.16 eV to 3.9 eV.

In a second aspect, the present disclosure provides a convolution processor. The convolution processor includes a plurality of optical synapse devices arranged in rows and columns, at least one light source, and an operating circuit. Each row of optical synapse devices is coupled to a coupled to a respective voltage line that receives an input voltage, and each column of optical synapse devices is coupled to a respective current line that receives an aggregated current generated from the corresponding optical synapse devices in response to the input voltage and one of, at least one specific wavelength of light, or no light. The at least one light source is configured to generate and direct the at least one specific wavelength of light onto predetermined optical synapse devices, where the at least one specific wavelength of light modulates a transconductance of the optical synapse device to be different from the transconductance of the optical synapse device that receives no light. The operating circuit processes the aggregated currents from at least two of the current lines according to a predetermined operation to provide a final current output.

According to embodiments of the second aspect, each of the input voltages corresponds to a pixel intensity value received from an optical sensor. For this embodiment, the plurality of optical synapse devices are arranged in 9 rows, and the input voltages correspond to pixel positions of a sub-image 3×3 pixels in size. In an aspect of this embodiment, a first and a second column of the optical synapse devices include light sources generating and directing green light onto specific optical synapse devices to execute one of a blurring edge, vertical edge detection and horizontal edge detection image processing kernels, with predetermined optical synapse devices receiving no light. In an alternate aspect, a first, a second, a third, a fourth and a fifth column of the optical synapse devices include light sources generating and directing green, blue and ultraviolet (UV) light onto specific optical synapse devices to execute a sharpening edge image processing kernel, with predetermined optical synapse devices receiving no light.

In a third aspect, the present disclosure provides a method for convolution processing an image consisting of i×j pixels, where i and j are integer values, to generate a filtered image consisting of i×j pixels. The method includes the steps of a) setting an input sub-image size of n×m pixels having a central pixel position P, where n and m are integer values, n is less than i and m is less than j; b) setting at least one image processing kernel configured with weights corresponding to each of the n×m pixel positions, where each weight is predetermined by differences in transconductance of the optical synapse device of claim 1 in response to at least two different light wavelengths; c) executing a dot product calculation between the pixel values of the sub-image and the at least one image processing kernel; d) mapping the dot product calculation result to pixel position P of the filtered image; and, d) iteratively repeating steps c) and d for all pixels of the image.

According to an embodiment of the third aspect, the at least one image processing kernel includes blurring edge, vertical edge detection and horizontal edge detection image processing kernels, and the at least two different light wavelengths correspond to green light and no light. According to an alternate embodiment, the at least one image processing kernel includes a sharpening edge image processing kernel, and the at least two different light wavelengths correspond to green light, blue light, ultraviolet light and no light.

In a fourth aspect, the present disclosure provides a method for fabricating an optical synapse device. The method includes the steps of depositing the electrically conductive layer on the substrate; forming the double oxide active layer on the electrically conductive layer; and depositing the transparent electrically conductive film electrode over the double oxide active layer.

According to an embodiment of the fourth aspect, the step of forming the double oxide active layer includes depositing a molybdenum trioxide (MoO$_3$) layer on the electrically conductive layer and depositing a zinc oxide (ZnO) layer on the MoO$_3$ layer. In a further embodiment, the fabrication method includes at least one additional fabrication step to increase an oxygen vacancy level of the double oxide active layer.

Other aspects and features of the present disclosure will become apparent to those ordinarily skilled in the art upon review of the following description of specific embodiments in conjunction with the accompanying figures.

BRIEF DESCRIPTION OF DRAWINGS

Embodiments of the present disclosure will now be described, by way of example only, with reference to the attached Figures.

DETAILED DESCRIPTION OF THE INVENTION

The embodiments of the present application describe an optical synapse device which can be used in a neuromorphic machine vision system to enable broadband sensing and fast data processing in applications where machine vision is used, such as for example in real-time video analysis, autonomous vehicles and medical diagnosis. The novel optical synapse device enables image sensing, convolutional processing, and computing. Multiple synaptic plasticity triggered by photons can implement photonic computing and information transmission. Convolutional processing is realized by ultra-low energy kernel generators fully controlled by photons. Meanwhile, the optical synapse device shows the ability of conductance modulations under electronic stimulations that implement neuromorphic computing. The novel two-terminal broadband optoelectronic synapse device enables front-end retinomorphic image sensing, convolutional processing, and back-end neuromorphic computing.

Figure 1:
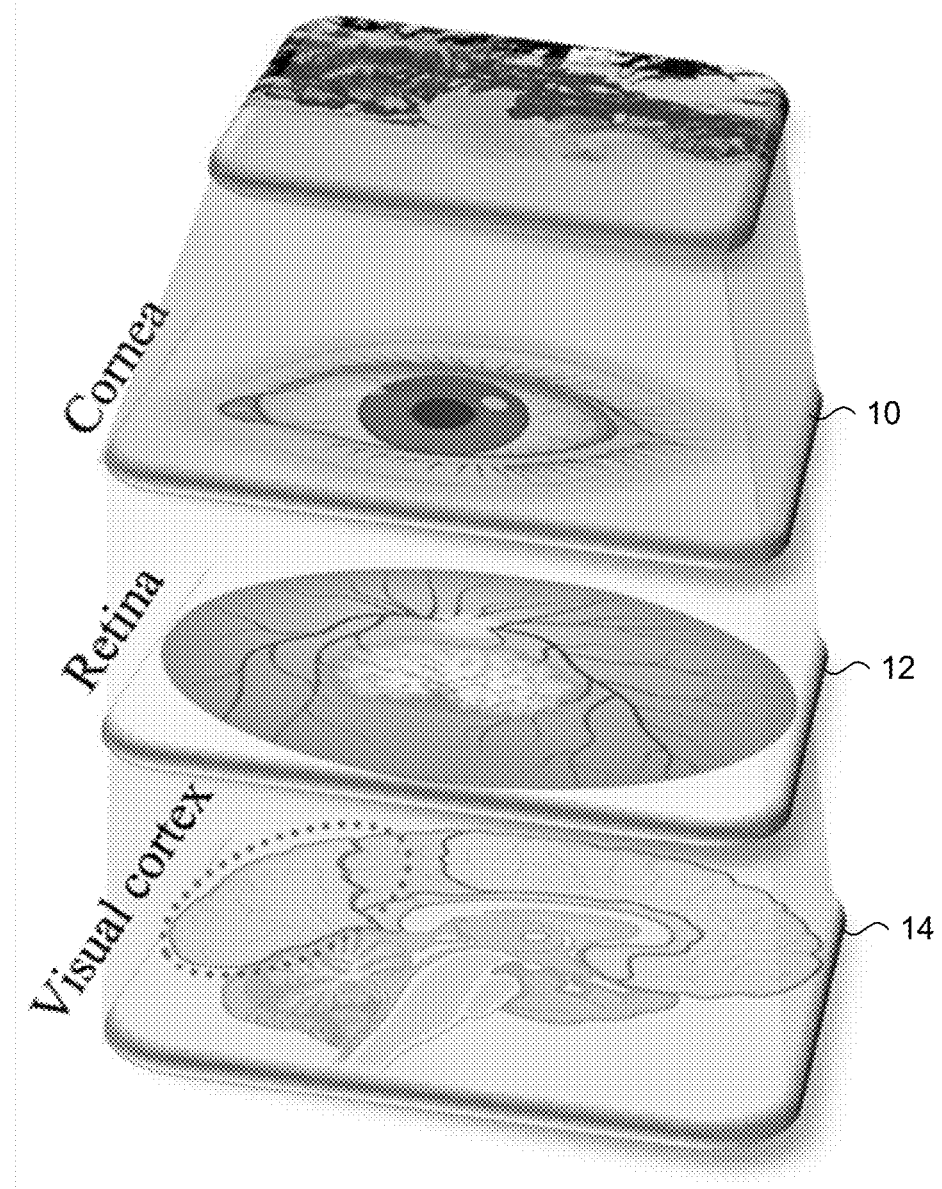
FIG. 1 is an illustration of the image processing hierarchy in biological systems.
Figure 2:
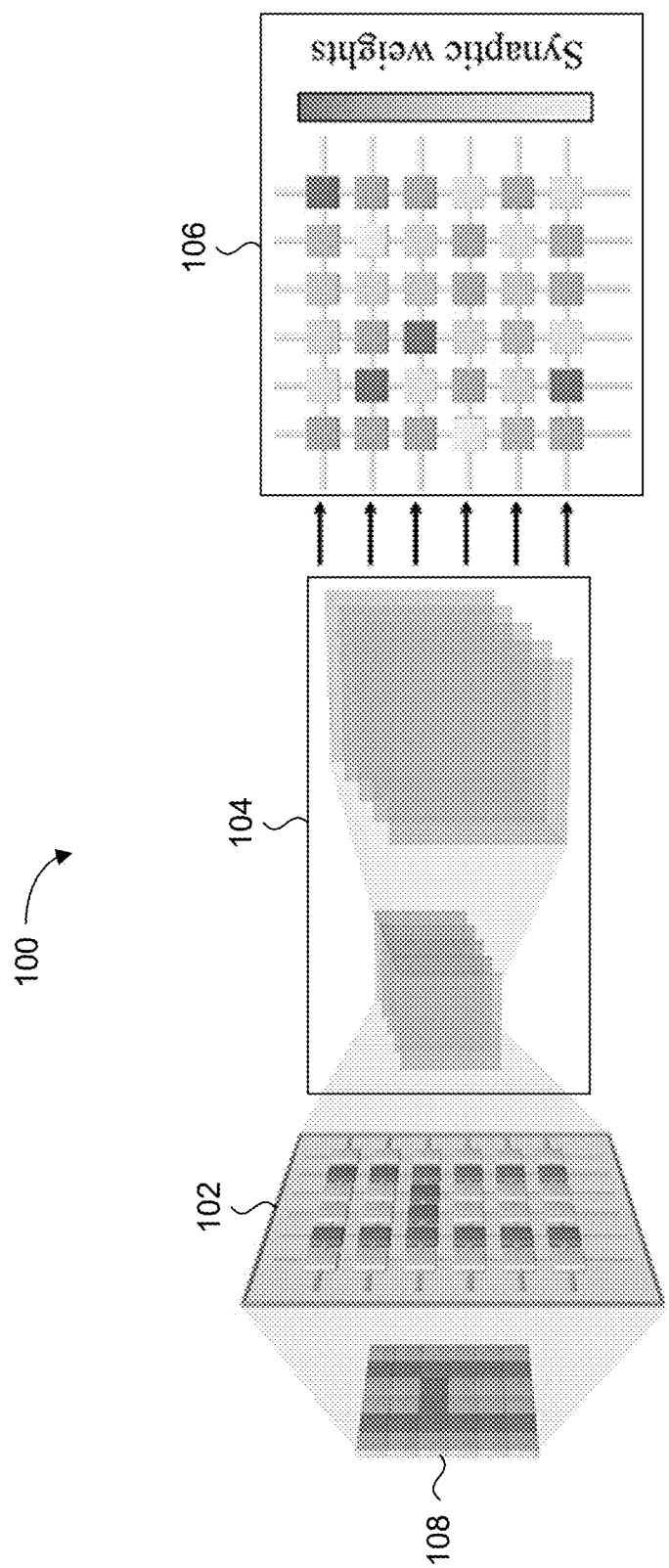
FIG. 2 is a block diagram of an integrated optoelectronic synapse hardware based vision machine system, according to a present embodiment.

FIG. 2 is a block diagram of an integrated optoelectronic synapse hardware based machine vision system, according to a present embodiment. This block diagram is provided to show an overview of the functional blocks of the system that execute optical sensing, convolution processing, and neuromorphic computing.

The machine vision system 100 of the present embodiment includes an optical sensor 102, a convolution processor 104 and a neuromorphic processor 106. The optical sensor 102 executes 2D image capture of a target 108, which in the example of FIG. 2 is an "H" shaped letter with different colours (not shown). Using the optical synapse device of the present embodiments, the colours of the target can be captured. Pixel values from the optical sensor 102 are used by the convolution processor 104 to generate a filtered image enhanced for at least edge detection purposes. Here, the convolution processor 104 includes a circuit consisting of the optical synapse device to execute this function. The filtered image data is then used by the neuromorphic processor 106 to accurately determine what the object in the target is. The neuromorphic processor 106 includes an array of the novel optical synapse device with programmable predetermined synaptic weights, which will ultimately determine that the object in the target is a letter "H". Accordingly, the novel optical synapse device of the present embodiments is multifunctional and enables multi-spectrum sensitivity for broadband image sensing, feature extraction, and neuromorphic computing.

Given its multifunctional attributes, a detailed description of the optical synapse device of the present embodiments now follows. According to a present embodiment, the optical synapse device is formed on a substrate, and includes a transparent electrically conductive film electrode configured to receive a voltage as an input. A double oxide active layer is adjacent to and receives light passed through the electrically conductive film electrode, and is configured to generate a current in response to light passed through the electrically conductive film electrode. Finally, an electrically conductive layer is interposed between the double oxide active layer and the substrate to provide the current as an output.

Figure 3:
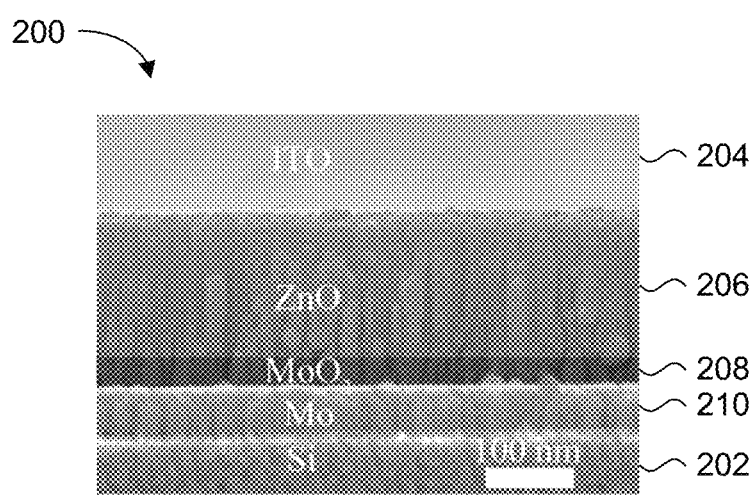
FIG. 3 is a diagram showing a cross section structure of the optical synapse device, according to a present embodiment.

FIG. 3 is a diagram showing a cross section structure of the optical synapse device 200 according to a present embodiment.

The optical synapse device 200 is formed as a stack of elements on a silicon substrate. In the orientation of the stack shown in FIG. 3, the silicon substrate 202 is at the bottom upon which the other layers are formed. From the top, the stack includes the layers of indium tin oxide (ITO) 204, a double oxide active layer of zinc oxide (ZnO) 206 and molybdenum trioxide ($MoO_3$) 208, and molybdenum (Mo) 210 interposed between the double oxide active layer and the substrate 202. The $MoO_3$ and ZnO layers forms a double oxide active layer, and in one example were fabricated to be 20 nm and 200 nm in thickness respectively. The Mo 210 is intended as a conductive layer, and is used as such in the presently described embodiment. However, any conductive layer which can be formed as a thin film can be used instead in alternate embodiments. For example, other conductive metals, such as copper, gold, titanium can be used instead of Mo 210, while the other layers remain the same.

Figure 4:
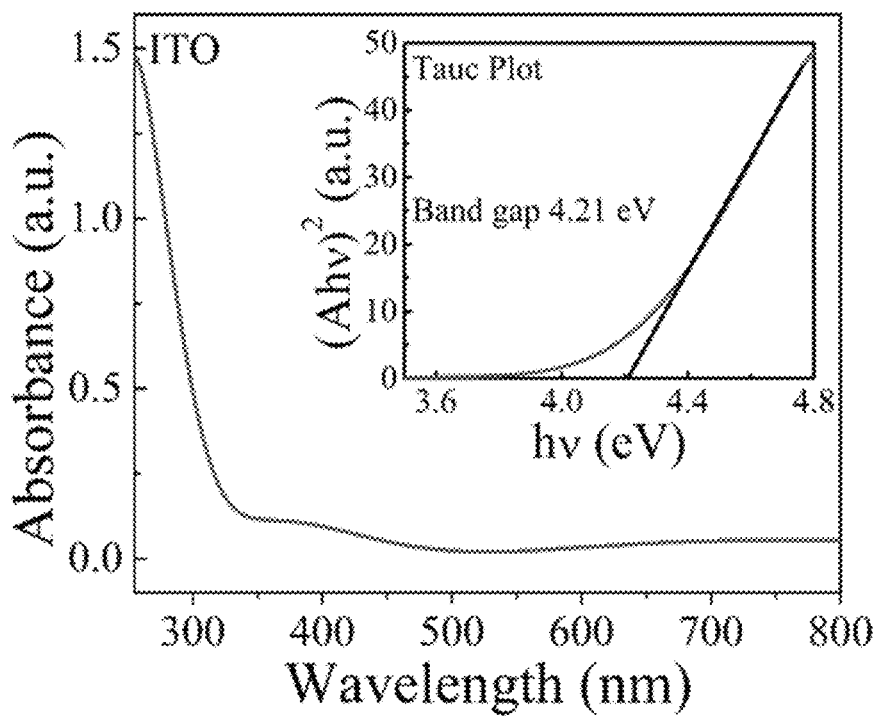
FIG. 4 is a plot of absorbance vs wavelength for an ITO thin film.

The ITO thin-film 204 is a transparent conductive film, utilized as the top electrode so that the light can go through the top electrode and interact with the double oxide active layer to realize photonic-controlled synaptic behaviors. The ITO thin-film 204 has relatively good conductivity with a sheet resistance of 5 Ω/sq, and thus also functions as an electrode for carrying a voltage. Experimental testing of the fabricated device yields the following characteristics. FIG. 4 is a plot of absorbance vs wavelength showing the UV-visible absorption spectroscopy of the ITO thin film 204. Inset in FIG. 4 is the Tauc plot for calculating the optical band gap. It can be seen that the optical absorption spectroscopy of the ITO thin film 204 shows a sharp decrease in the wavelength range of approximately 260-330 nm followed by a plateau region. The optical band gap was calculated based on the absorption spectrum described by the Tauc plot. In one manufactured example, the band gap of ITO thin film 202 is 4.21 eV.

Figure 5:
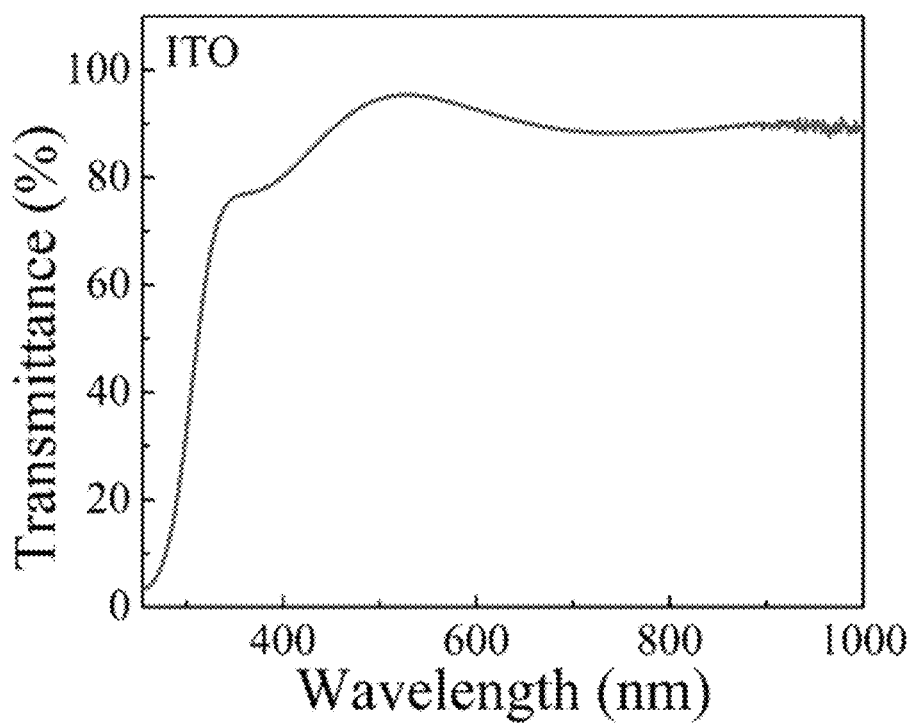
FIG. 5 is a plot of transmittance versus wavelength for the ITO thin film.

FIG. 5 is a plot of transmittance versus wavelength, and shows the UV-visible transmittance spectroscopy of the ITO thin film 204. It can be seen from FIG. 5 that the transmittance spectroscopy of the ITO thin film 204 shows a transmittance to light with a wavelength higher than 390 nm surpasses 80%. The high transmittance allows more photons with a wide range of wavelengths to go through the top electrode, which benefits the photonic modulation on the device 200.

Figure 6:
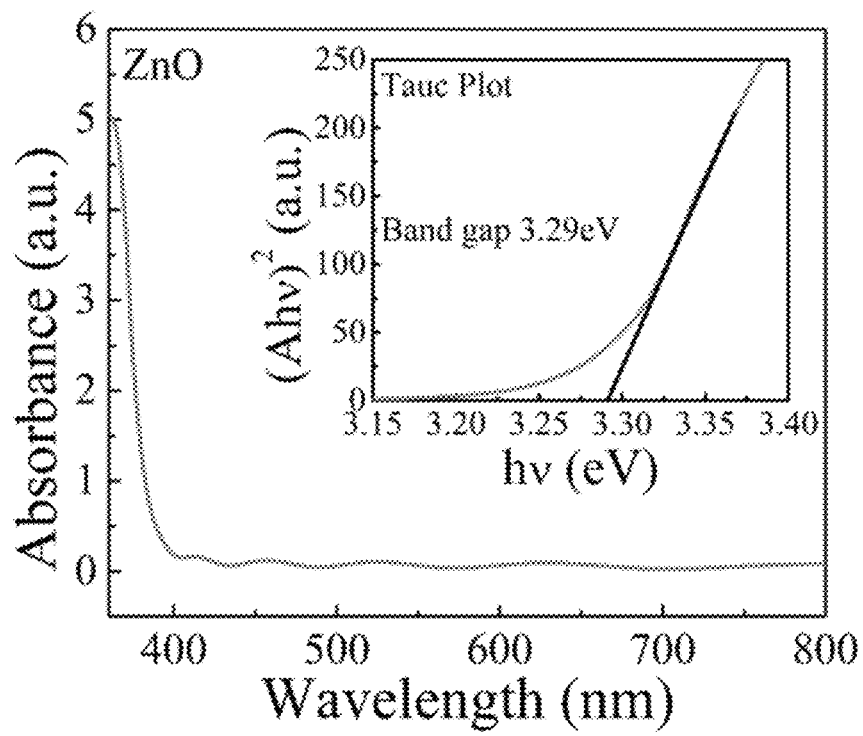
FIG. 6 is a plot of absorbance versus wavelength for a ZnO thin film.
Figure 7:
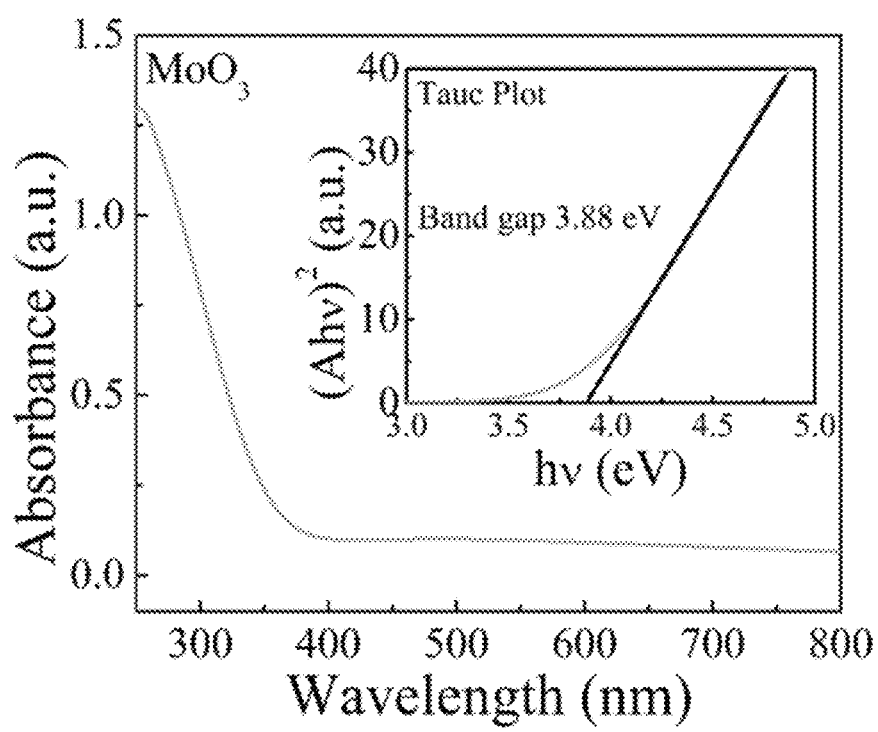
FIG. 7 is a plot of absorbance versus wavelength for a MoO3 thin film.

FIG. 6 is a plot of absorbance versus wavelength showing the UV-visible absorption spectroscopy of the ZnO thin film 206. Inset inside FIG. 6 is the Tauc plot for calculating the optical band gap. FIG. 7 is a plot of absorbance versus wavelength showing the UV-visible absorption spectroscopy of the $MoO_3$ thin film 208. Inset in FIG. 7 is the Tauc plot for calculating the optical band gap. The Tauc plots of optical absorption spectroscopies of ZnO and $MoO_3$ thin films 206 and 208 determined the band gaps of 3.29 eV (ZnO) and 3.88 eV ($MoO_3$). This confirms the strong absorption feature over the ultraviolet region. This can explain how the optical synapse device 200 is sensitive to ultraviolet light (390 nm). Particularly, the optical synapse device 200 also shows responses to light illumination with wavelengths of 460 nm and 570 nm.

Because some defects (oxygen vacancies) in the active layer induced impurity energy levels inside the forbidden band of ZnO 206 and $MoO_3$ 208. These defect energy levels can absorb photons with higher wavelengths and change the carrier density of the active layer, demonstrating multi-spectrum sensitivity. According to a present embodiment, the concentration of these oxygen vacancies can be engineered to modify the cutoff wavelength of materials, which broadens spectrum sensing ranges and applications. From conducted experiments, the bandgap of ZnO was narrowed from 1.91 eV to 0.77 eV after oxygen vacancies were intentionally induced, indicating that the generated oxygen vacancies increased the conductivity of ZnO (resistance decreased).

The optical synapse device 200 of the present embodiment can be fabricated with a traditional CMOS process. Following is an example of one process used to fabricate the presently described optical synapse 200. A wafer covered with $SiO_2$ oxide (280 nm) was used as the substrate. Before the device fabrication, the substrate was ultrasonically cleaned in water, ethanol, and acetone sequentially. The electrode and active layer materials were deposited by magnetic sputtering with a background pressure of $5\times10^{-7}$ Torr. The target was Mo metal was used as a bottom electrode by direct current (DC) magnetic sputtering. 100 W was the sputtering power and 5 mTorr was the deposition pressure. The working gas was pure Ar. The $MoO_3$ layer was deposited via reactive sputtering. 100 W was the sputtering power. 5 mTorr was the deposition pressure. The working gas was pure $Ar/O_2$ (3/1). For the ZnO, radiofrequency (RF) magnetic sputtering was used. The target was ZnO. 200 W was the sputtering power. 5 mTorr was the deposition pressure. The working gas was $Ar/O_2$ (24/1). A piece of shadow mask was utilized to fabricate the 100 μm device. The ITO was deposited by RF magnetic sputtering. The target was ITO. 100 W was the deposition power. 5 mTorr was the deposition pressure. The working gas was $Ar/O_2$ (20/0.3). The deposition temperature was set to 200° C. (substrate temperature).

In the presently described embodiment, the thicknesses of ZnO and MoO3 are examples only and these layers of can be fabricated to any thickness below 200 nm, and even below 20 nm, to improve higher integration density.

As mentioned earlier, the oxygen vacancies can be engineered to obtain desired effects in the ZnO material. Certain techniques can be adopted to change the concentration of oxygen vacancies in the material, relative to the outlined process above. In a first technique, the oxygen composition of the ZnO target can be modulated. In a second technique, the $O_2$ content of the working gas ($Ar/O_2$) can be decreased to increase the concentration of oxygen vacancies in deposited thin films. Furthermore, the pressure in the sputtering chamber can be adjusted to tune the amount of oxygen vacancies of the deposited materials in device. In a third technique, the post-annealing process can be adjusted to modify the oxygen vacancy features. For example, the temperature used in the post-annealing process in an oxygen environment can be decreased to increase the amount of oxygen vacancies.

Density functional theory (DFT) calculations confirm the trend of a narrower band gap and higher conductivity by inducing oxygen vacancies. Besides, the working function increased when oxygen vacancies were brought into ZnO, which modulated the Schottky barrier height at the interface. The Schottky emission occurs when activated electrons overcome the energy barrier. Modulating the barrier height can induce resistive switching behaviours.

It should be noted that the amount of oxygen vacancies should not be increased to a point where $MoO_2$ is formed instead of $MoO_3$. $MoO_2$ is another crystal phase with different properties.

The previously described embodiments of the ZnO thin film 206 and of the $MoO_3$ thin film 208 were identified as having specific band gaps of 3.29 eV and 3.88 eV respectively. According to alternate embodiments, the ZnO thin film 206 can have a band gap within the range of 3.10 eV to 3.44 eV at room temperature, while the $MoO_3$ thin film 208 can have a band gap within the range of 3.16 eV to 3.9 eV at room temperature. This variance in the band gaps is possible by changing the amount of oxygen vacancies during fabrication, as previously described.

The resulting layers were characterized, which showed that high-quality materials regarding surface morphology, composition distribution, and crystal purity were fabricated.

The optoelectronic synapse device of the present embodiments is configured as a two-terminal device based on metal oxide materials that are compatible with traditional CMOS processes, facilitating easy scalability and high integration density with current semiconductor technology. The optoelectronic synapse device of the present embodiments is sensitive to a broadband spectrum (ultraviolet and visible light regions), and can mimic the biological plasticity of Excitatory Postsynaptic Current (EPSC), paired-pulse facilitation (PPF), spike-amplitude-dependent plasticity (SADP), and spike-number dependent plasticity (SNDP), hence making it useful for image sensing, photonic computing, and optical communication.

Figure 8:
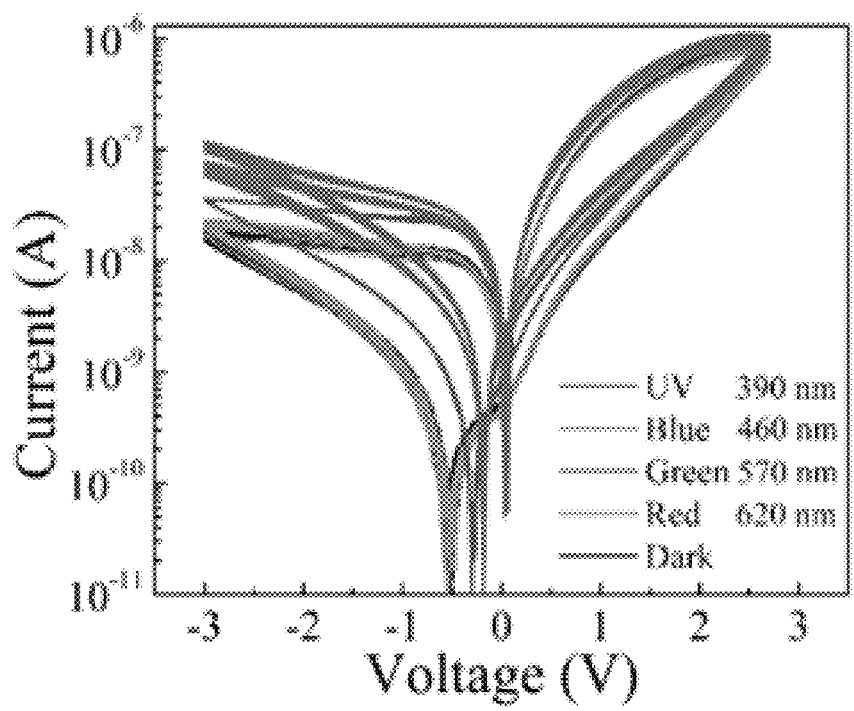
FIG. 8 is a plot of current versus voltage showing resistive switching under illumination with different wavelengths.

The optoelectronic synapse device 200 of the present embodiments with multi-spectrum sensitivity has been investigated under photonic stimuli. The I-V curves of resistive switching were studied under illumination with different wavelengths (light density of 8 $\mu W/cm^2$), and are shown in the plot of FIG. 8. Hysteresis loops were observed, demonstrating memristive effects in response to the light wavelengths corresponding to the light wavelengths of UV, blue, green, red, and the absence of light (dark). The device was at a high resistance state (HRS). It was switched to a low resistance state (LRS) when positive voltages were applied as the current was higher (the resistance was lower). The device was switched back to HRS when negative voltages were applied as the current changed to smaller values under the same voltage.

Figure 9:
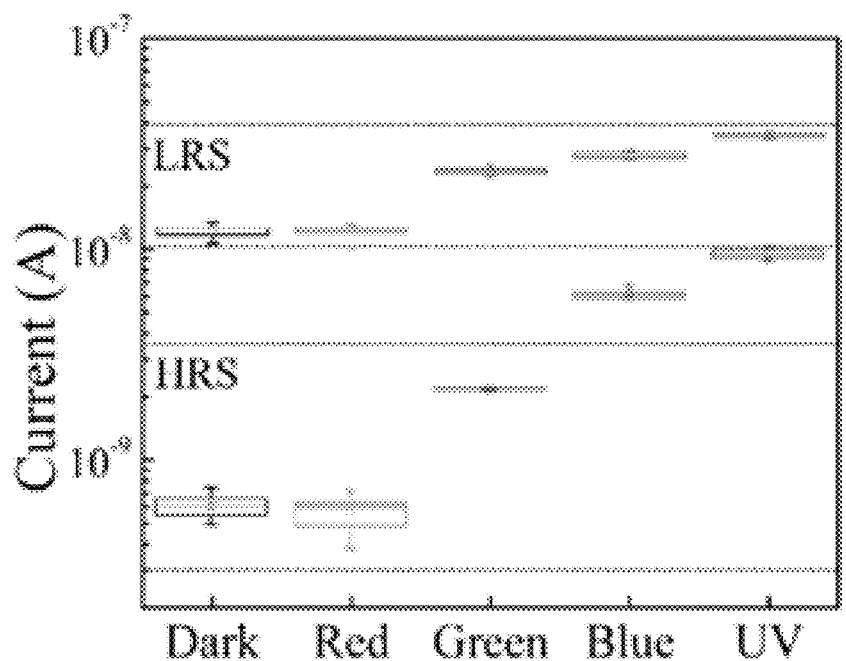
FIG. 9 is a plot of HRS and LRS under illumination with different wavelengths.

The device exhibited an analog resistive switching. The resistance of the device changed gradually instead of abrupt changes, which demonstrates its ability to mimic synaptic plasticity for neuromorphic computing. Besides, the resistive switching was asymmetric due to the asymmetric structure of the device. More specifically, the stacking order of ITO/ZnO/MoO$_3$/Mo/Si is not symmetric, since none of the materials are the same and the top and bottom electrodes are different. This feature benefits the alleviation of sneak currents in integrated crossbar arrays. Notably, the device was sensitive to multiple spectra maintaining resistive switching capabilities. The current under both HRS and LRS increased by different margins when the UV light (390 nm), blue light (460 nm), and green light (570 nm) were shined on the device. The changes in the HRS and LRS under different photonic stimuli are shown in FIG. 9, using a read voltage of −0.8 V. The error bar describes the cycle-to-cycle variation. The resistance of both HRS and LRS was decreased under light illumination compared to their dark counterparts. UV (390 nm) induced more significant changes in device resistance compared to the blue light (460 nm), and green light (570 nm) counterparts. The device was insensitive to red light (620 nm), because the photon of red light did not have enough energy to generate carriers, but is sensitive to light having wavelengths below 620 nm.

Figure 10:
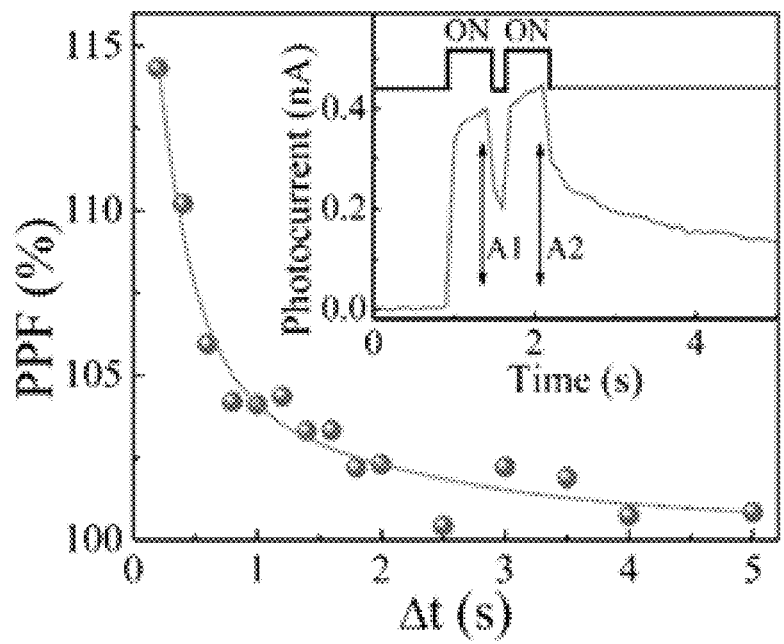
FIG. 10 is a plot showing short-term synaptic PPF behavior under photonic stimulations.

Moreover, the synaptic plasticity of the optoelectronic synapse device 200 under different light illuminations has been studied. In biological systems, the transmission of neurotransmitters via synapses requires a certain delay time to relax after excitation. The net synaptic strength can be observed because of residual neurotransmitter ions in the last excitation. This is the classical characterization of PPF. The PPF feature was investigated in the device operated by UV photons as described by Equation (1):

$$PPF = \frac{A_2}{A_1} \times 100\% \quad (1)$$

where $A_1$ and $A_2$ are photocurrents after the first and second light pulse respectively. It was observed that the plasticity strength decreased exponentially with the increase of interval time between two consecutive pulses. FIG. 10 is a plot showing short-term synaptic PPF behaviour under photonic stimulations. The inset of FIG. 10 presents the typical photocurrent characteristics under two photonic stimulations. The results fitted with Equation (2):

$$y = \alpha e^{\frac{\Delta t}{\tau_1}} + \beta e^{\frac{\Delta t}{\tau_2}} + y_0 \quad (2)$$

where $\alpha$, $\beta$, $\tau_1$, $\tau_1$, and $y_0$ are fitting constants. The light wavelength was 390 nm (ultraviolet, UV), pulse duration was 500 ms. The fitting parameters used were: $\alpha$=5.349, $\beta$=18.916, $\tau_1$=1.803, $\tau_1$=0.279, $y_0$=100.514. The experimental results fitted well with the theoretical equation, demonstrating that the device can mimic the biological short-term PPF by photonic operations.

Figure 11:
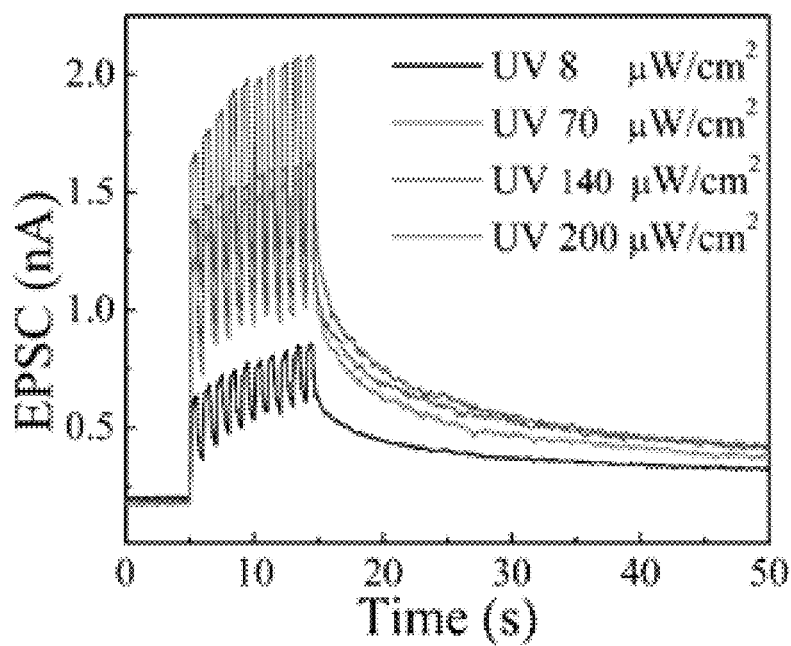
FIG. 11 is a plot showing EPSC responses under UV light with different power densities.

Besides, the SADP has been obtained in FIG. 11, which shows EPSC responses under UV light with different power densities. 10 pulses with different power densities were applied to the device, with a pulse frequency of 1 Hz and a duty cycle of 50%. The EPSC represented by currents following through the device increased with the increase of the power density. This mimicked the biological function that stronger stimulations trigger higher amplitudes of responses.

Figure 12:
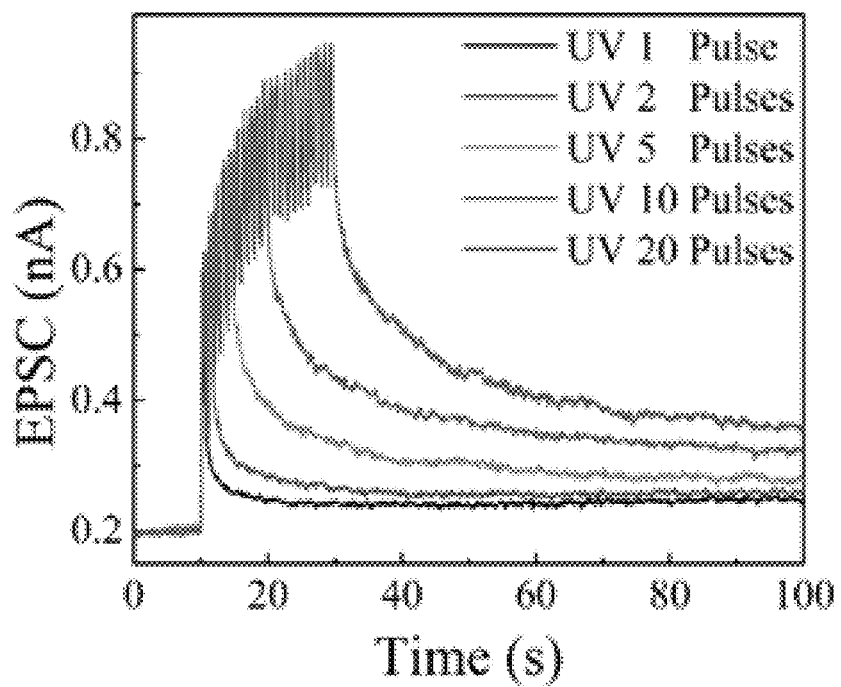
FIG. 12 is a plot showing EPSC responses under UV light under different pulse numbers.

FIG. 12 shows the EPSC response under UV light with different pulse numbers. The pulse frequency was 1 Hz, and the duty cycle was 50%. Higher EPSC responses after more pulses were observed. This feature was similar to the SNDP in biological systems, in which multiple and repeated stimulations can induce stronger responses in biological individuals. The EPSC increased with the function of time for both SADP and SNDP, which was due to more stimuli generating more carriers. Notably, the device was sensitive to multiple spectra.

Figure 13:
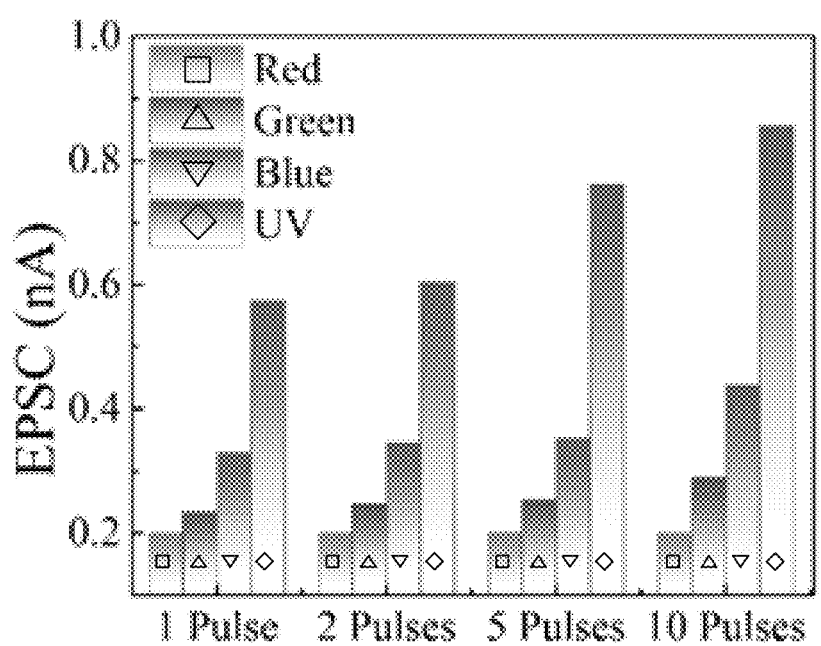
FIG. 13 is a plot showing EPSC values under photonic stimulations with different wavelength and pulse numbers.

The EPSC response curves under different photonic wavelengths and pulse numbers were obtained, with the results of summarized EPSC values being shown in FIG. 13. This shows that obvious responses were observed when the photonic wavelength was shorter than 570 nm. The UV light induced the strongest responses. The green light (570 nm) triggered the weakest responses compared to UV (390 nm) and blue (460 nm) light counterparts. Moreover, more pulses induced stronger EPSC responses, which was consistent with the UV operations shown in FIG. 12. The optoelectronic synapse device 200 of the present embodiments is sensitive to broadband spectrums.

This broadband multi-spectra sensitivity of the optoelectronic synapse device 200 of the present embodiments endows the device with the capability of colour recognition, image sensing, cognitive tasks, and optical communications. A single device for detecting light with different wavelengths can avoid using multiple photodetectors for different light wavelengths, which will decrease manufacturing costs and the system complexity. Accordingly, the optoelectronic synapse device 200 can be used in the optical sensor 102 to capture images.

Figure 14:
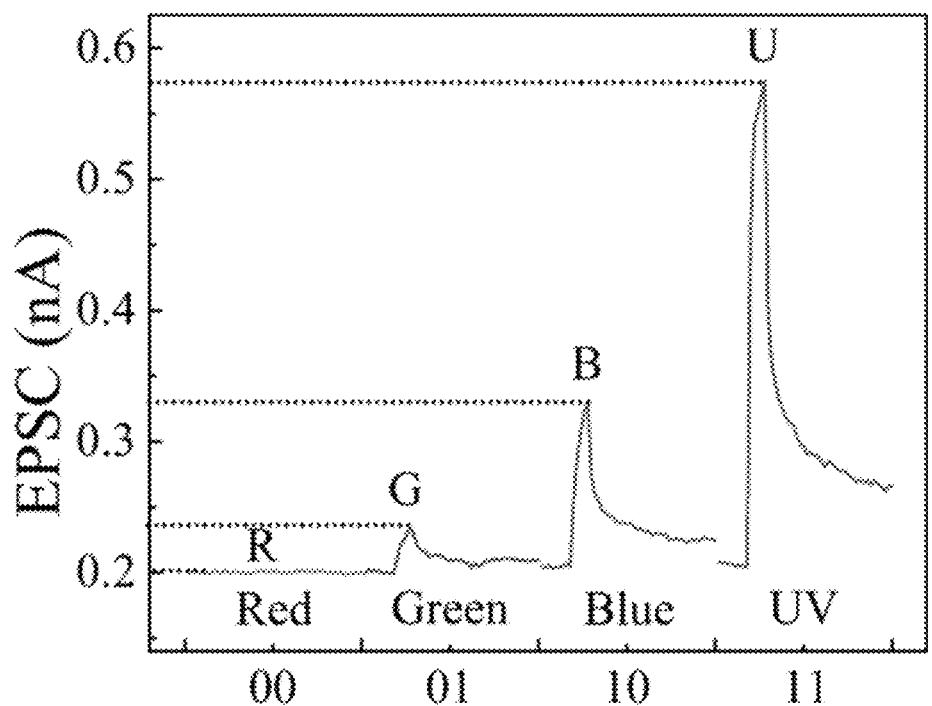
FIG. 14 is a plot showing the EPSC responses of Red, Green, Blue, and UV photons mapped to binary codes.

Information communication is another application for the optoelectronic synapse device 200 of the present embodiments. The different responses of the optoelectronic synapse device 200 to different light wavelengths can be utilized for optical communications, which can realize data transmission that demonstrate better transmission speed and energy efficiency compared to electrical system counterparts. Specifically, the photonic wavelengths of 620 nm (Red), 460 nm (Green), 570 nm (Blue), and 390 nm (UV) can be used to represent "00", "01", "10", and "11" respectively. The digital information in the form of binary code ("0" and "1") can be demodulated, stored, and transmitted by photonic signals. As shown in the plot of FIG. 14, the EPSC responses of Red (R), Green (G), Blue (B), and UV (U) photons were around 0.20 nA (R), 0.23 nA (G), 0.33 nA (B), and 0.58 nA (U) respectively. One pulse of light stimulation with the duration of 0.5 s was used.

With the scheme described above, up to four photonic pulses can be used in a specific sequence as a pulse group to represent a single character of the ASCII system, which includes 128 characters including text, numbers and punctuation. Then multiple pulse groups can be used in a sequence to construct a string representing a word. If each of the four pulses can be either red, green, blue or UV, then each pulse group can represent up to 4×4×4×4=256 possible characters.

Figure 15:
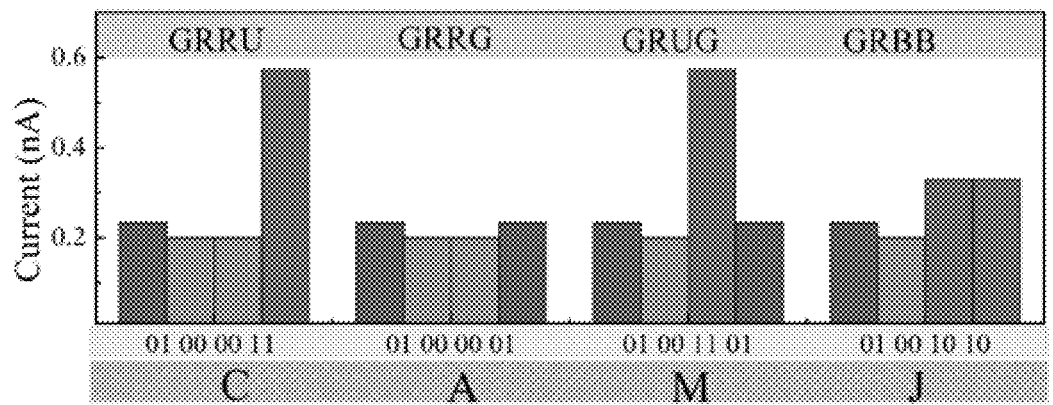
FIG. 15 shows example decoding of the optoelectronic synapse device to the American Standard Code for Information Interchange (ASCII), according to a present embodiment.

For example, based on the ASCII, four photonic pulses with the wavelength mapping above can be demodulated into four letters "CAMJ". In the present example, the GRRU pulse group represented 01000011, the GRRG pulse group represented 01000001, the GRUG pulse group represented 01001101, and the GRBB pulse group represented 01001010. This is graphically shown in FIG. 15. Particularly, the energy consumption required is very low, where the average electronic energy consumption for one letter is approximately 150 pJ. The energy (E) can be calculated by E=U*I*t, where U is applied voltage, I is current, t is time, and when a constant voltage is applied and a light pulse is shined onto the device, the current will spike. The electric consumption is calculated during the shining of the light. The low energy consumption makes the optoelectronic synapse device 200 of the present embodiments appealing for energy-efficient systems.

The optical synapse device of the present embodiments has previously been described for use in an optical sensor for generic image sensing, and alternatively for high speed and low power data communication. Yet another application for the optical synapse device is for convolution image processing.

Figure 16:
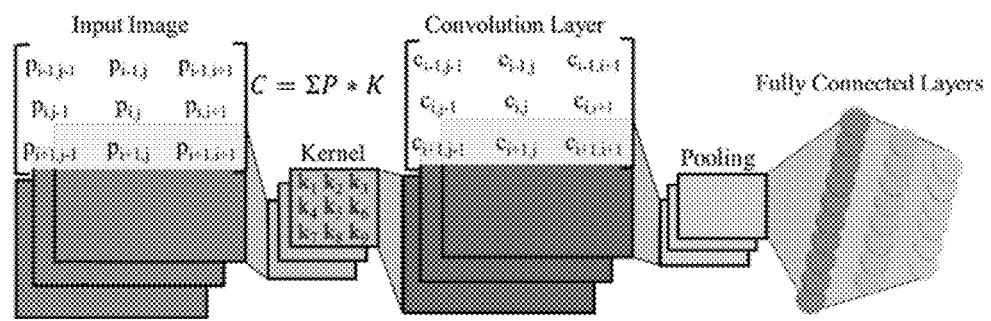
FIG. 16 is a diagram showing functional blocks of the machine vision system of FIG. 2, according to a present embodiment.

Convolution neural networking (CNN) is very powerful and popular for image recognition. It consists of convolution layers, pooling layers, and fully connected classification layers as shown in FIG. 16. FIG. 16 is a diagram showing the functional blocks of a machine vision system corresponding to the system 100 shown in FIG. 2, according to a present embodiment. In the present embodiment, the optical sensor 102 provides the input image, while the convolution processor 104 filters the input image. Convolutional layers are used to pre-process images to extract high-level features, which benefits dealing with complex images and achieving higher recognition accuracy. The filtered image used by the 106 neuromorphic processor having fully connected layers to provide image recognition. The pooling layers are employed to reduce the spatial size of inputs. This action speeds up processing procedures. The fully connected layer performs deep learning algorithms to complete image recognition tasks, which can be implemented by any memristive-based hardware for neuromorphic computing.

Therein, kernel operations occurring in convolution layers are necessary for CNNs. The kernel can be a 2D matrix that slides over the input image pixel by pixel to complete the convolution operation. Different well known convolution kernels can achieve the functions of soft (blurring edge), edge detection (vertical edge highlight and horizontal edge highlight), sharpening edge, and more. Accordingly, the previously described optoelectronic synapse device with multi-spectra sensitivity has been used to develop a photonic kernel generators to realize high-speed and low-energy convolutional processing. An overview of the convolutional image processing is now described with reference to FIG. 17.

Figure 17:
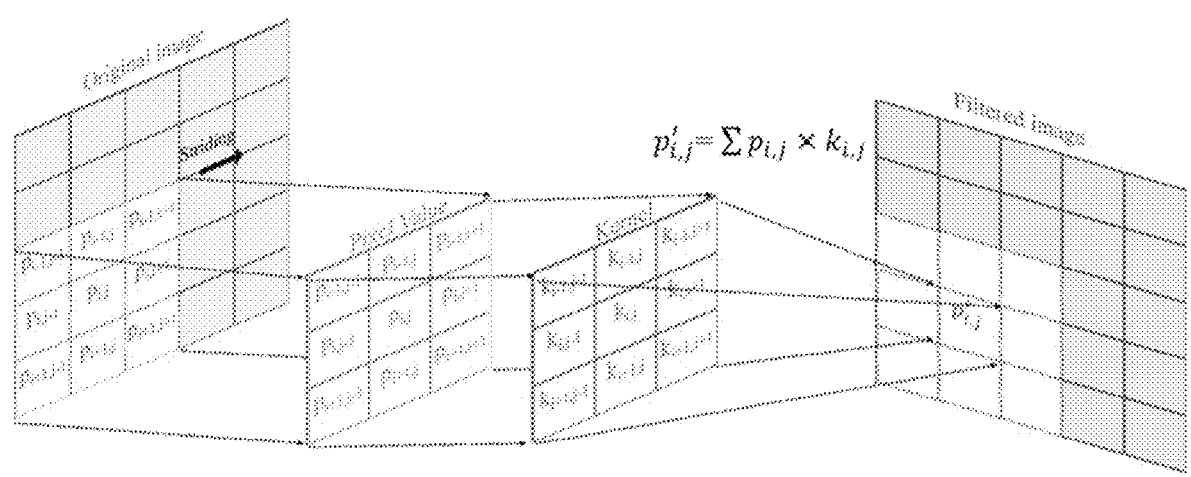
FIG. 17 shows an example a dot product calculation execution in the convolution processor of FIG. 2, according to a present embodiment.

FIG. 17 shows an example of how a dot product calculation is performed in the convolution processor 104 of FIG. 2, according to a present embodiment. An original image captured by the optical sensor 102 is presented graphically on the left side of FIG. 17, as a pixel array, each having a pixel value. It is assumed that each pixel value, in volts, is generated based on a gray scale intensity value. In an example configuration, the pixel values are quantized into 21 values that normalized into the voltage ranging from 0.5 V to 1.1 V.

In this example, for a specific position (Pij) in the image, the neighboring 8 pixels are extracted to form a 3×3 input sub-image. A dot product between the input pixels and at least one image processing kernel is calculated to get the filtered Pij. A striding action is required so that the at least one kernel sweeps over the entire original image. For any pixel Pij having no neighbor pixels in the original image, a padding is applied to create fake neighbors to have a null value of 0. A stride of 1 is used during the convolution process so that the process iteratively performs the dot product calculation for each pixel location of the original image.

Over multiple iterations, a series of dot product results are obtained to reconstruct a pixel map. The resulting pixel map is referred to as a convolved image or a filtered image. In the present embodiments, the dot product result are currents based on the equation I=V*G, where I is current, V is voltage, and G is conductance. The voltage is provided by the pixel value, and G is the conductance of a particular optoelectronic synapse device. According to the present embodiment, the kernels are configured to have weights that are predetermined by differences in conductance of the optoelectronic devices in response to at least two different light wavelengths. The hardware circuit for executing the dot product calculation based on at least one image processing kernel using the presently described optoelectronic device is described later.

It is noted that the input sub-image is not restricted to the 3×3 size shown in the example of FIG. 17, and can be a larger sub-image that still has a central pixel Pij, but with immediately neighboring pixels and other pixels adjacent to the immediately neighboring pixels. As previously mentioned, at least one image processing kernel can be used in the present embodiments.

Figure 18:
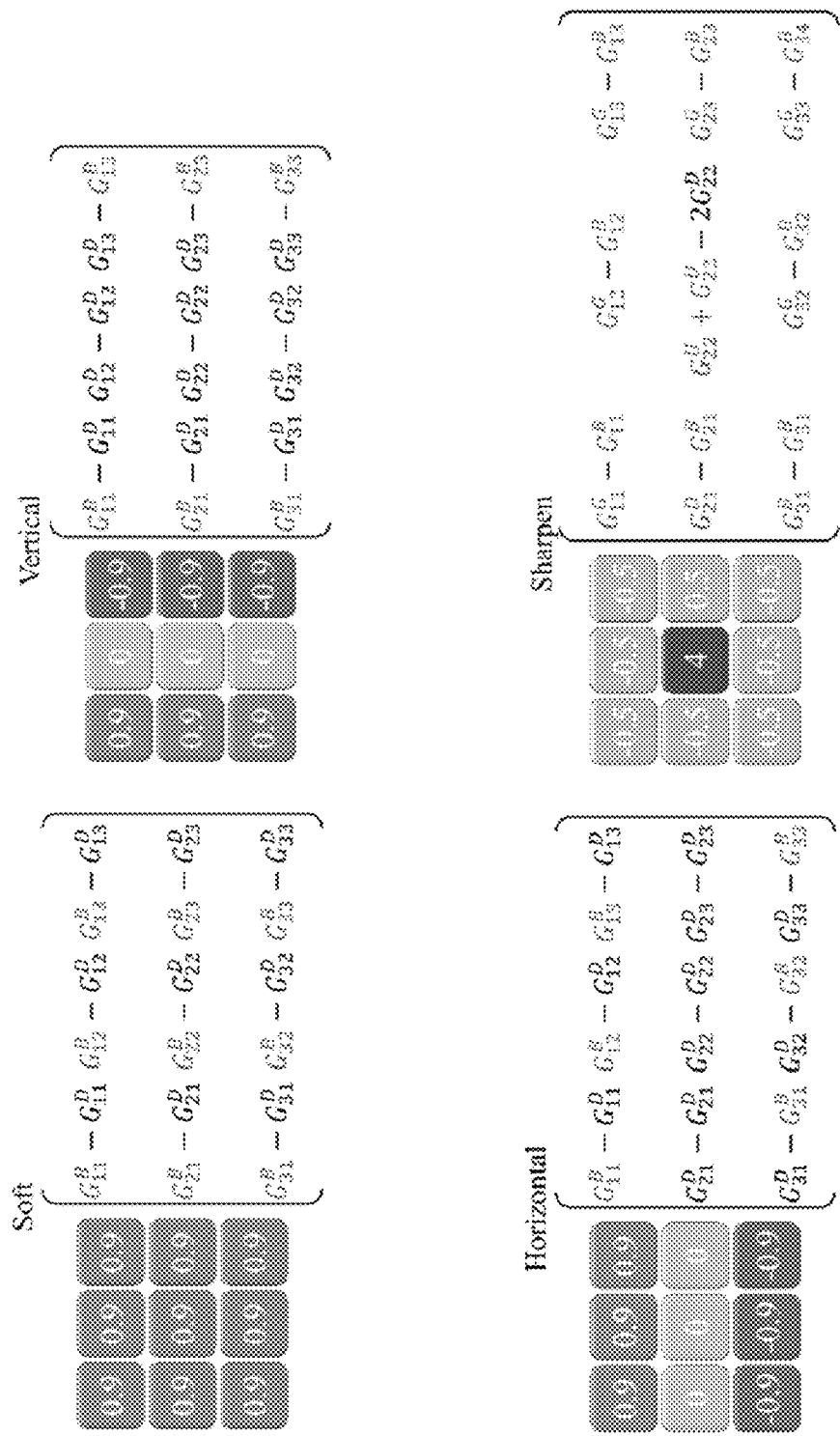
FIG. 18 shows the configuration setup for 4 different imaging processing kernels, according to a present embodiment.

FIG. 18 shows the configuration setup for 4 different imaging processing kernels based on photonic operation, according to a present embodiment. In FIG. 18, kernels for soft, vertical, horizontal and sharpen image processing are shown, with the configuration formulas shown in brackets. In the present embodiments, different light wavelengths are impinged on a top layer of the optoelectronic synapse device to change its conductance. A positive index, for example, 0.9, is generated by $G^G$ (device conductance under green light illumination) minus $G^D$ (device conductance under dark conditions). In comparison, a negative index, for example, −0.9, is generated by $G^D$ minus $G^B$ (device conductance under blue light illumination) Similar rules are applied to the generation index of −0.5 and 4 (where $G^U$ is device conductance under UV light), which utilize different light wavelengths to induce different magnitudes of conductance changes. It is noted that intensity of the light, the number of pulses of the light and applied voltage can affect the index/weight values. In the present embodiments, lasers with specific wavelengths are positioned locally over specific optoelectronic synapse devices. In the presently described example configuration, testing reveals that the conductance gain over the voltage window of 0.5-1.1 v is nearly consistent under light illumination.

Following is an explanation for the purposes of the above described kernels.

The soft image processing kernel yields a blurred image because of the average operation on each pixel. Blurring is important in image processing, which realizes smooth transitions between adjacent pixels instead of sharp changes. This is especially necessary for shrinking images, in which sharp details will be sacrificed. The smoothing process distributes the pixel transition over more adjacent pixels to preserve edges in smaller images. Edge detection is relevant for image processing to extract crucial information and possible object tracking for autonomous vehicles and other applications where object identification is needed. The Prewitt kernel edge detectors of both vertical and horizontal image processing kernels are utilized for image processing, where the vertical image processing kernel sharpens vertical edges in the image. Meanwhile, the horizontal edges were more prominent after the horizontal image processing kernel is applied. The image sharpening kernel increases the intensity of edges.

Figure 19:
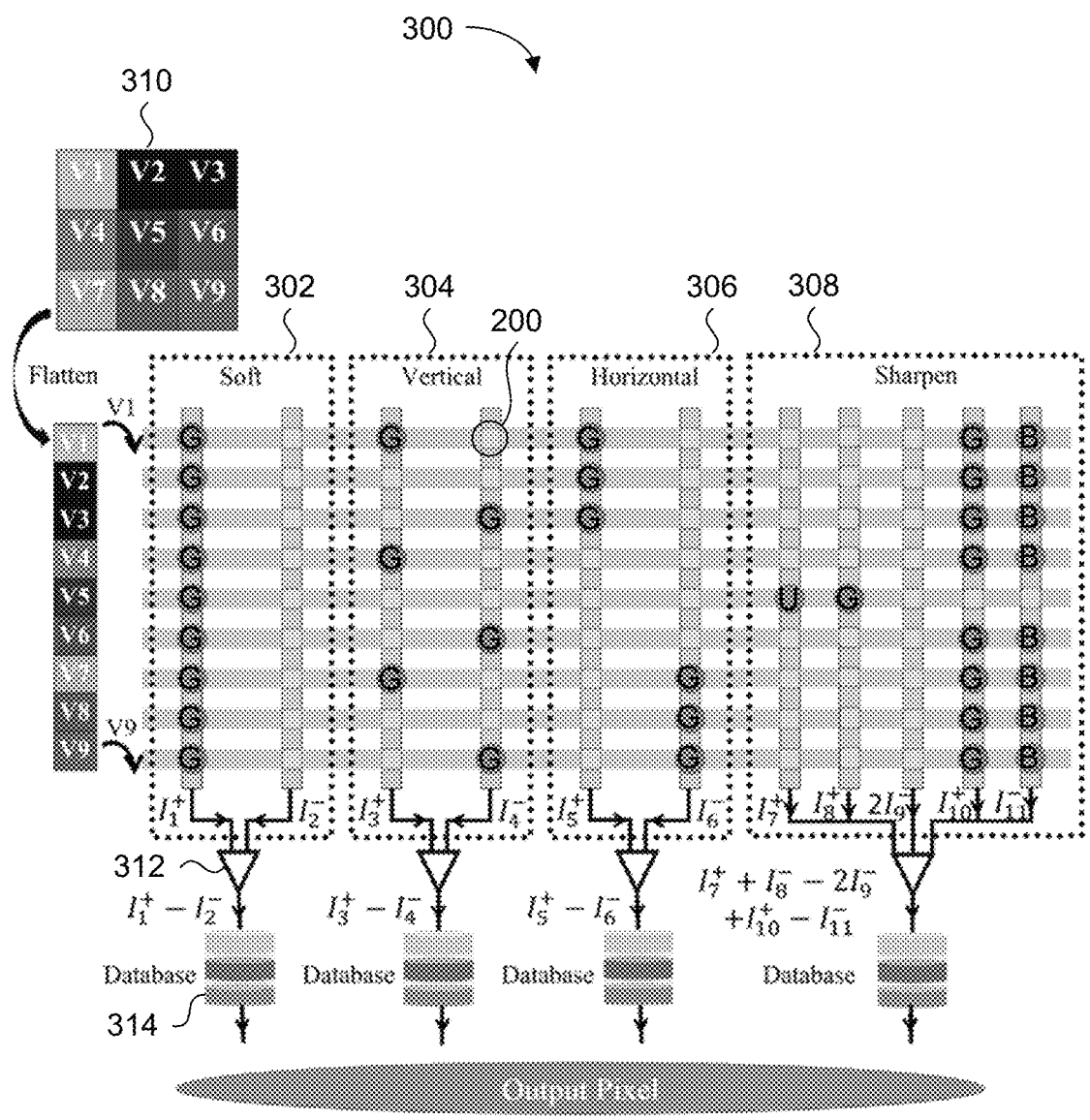
FIG. 19 is a schematic of a convolution processor using a plurality of optical synapse devices, according to a present embodiment.

A hardware based convolution processor according to a present embodiment is shown in FIG. 19. This example configuration is based on the 3×3 sub-image and image processing kernels, and can be used in the system 100 of FIG. 2.

The convolution processor 300 of FIG. 19 is a hardware circuit including a plurality of optical synapse devices 200 of FIG. 3 are arranged in a crossbar configuration. Convolution processor 300 can be the hardware implementation embodiment of convolution processor 104 shown in the machine vision system 100 of FIG. 2. Only one optical synapse device 200 is annotated in FIG. 19. More specifically, the plurality of optical synapse devices 200 are arranged in rows and columns. Each row of optical synapse devices 200 are coupled to a respective voltage line. In the present embodiment, this voltage line is the ITO layer 204 which acts as a first electrode that receives a voltage. Similarly, each column of optical synapse devices 200 is coupled to a respective current line that receives an aggregated current generated from the corresponding optical synapse devices 200 coupled to it. In the present embodiment, this current line is the molybdenum layer 210 which acts as a second electrode. In this shown configuration, the optical synapse devices 200 of a column generate specific currents in response to the voltage it receives and light of at least one specific wavelength or no light impinging on the ITO layer 204.

According to the present embodiment, the convolution processor 300 is configured to execute at least one image processing kernel. In the example of FIG. 19, the convolution processor 300 is configured to execute four different image processing kernels; soft kernel 302, vertical kernel 304, horizontal kernel 306 and sharpen kernel 308. In the example of FIG. 19, these image processing kernels are hardware implementations of the corresponding kernel configurations shown in FIG. 18.

Localized light sources generating light of a specific wavelength are directed onto predetermined optical synapse devices 200 for each kernel. The selection of these predetermined optical synapse devices 200 is based on the 3×3 sub-image pixel locations and their corresponding voltages. It is assumed that an originally captured image is transformed into grayscale (0-255), with the grayscale values normalized into a voltage mapping representing the image. The pixel values are quantized into 21 values that were normalized into the voltage ranging from 0.5 V to 1.1 V. The interval voltage was 0.03 V which was the same as the measurement parameter. In the configuration shown in FIG. 19, the sub-image 310 is 3×3 pixels with corresponding voltages V1-V9 for the specific pixel positions. These nine voltages are applied to nine different rows of optical synapse devices 200. Therefore specific light sources generating the specified wavelength are directed onto specific optical synapse devices 200 in order to implement a particular kernel.

Looking at vertical kernel 304, it can be seen that a light source generates the green wavelength of light (570 nm) and is directed at the optical synapse devices that receive voltages V1, V4, V7, and V3, V6 and V9. This follows the intended configuration for the vertical kernel shown in FIG. 18. The sharpen kernel 308 includes, in addition to light sources that generate green light, light sources that generate UV light (390 nm) and blue light (460 nm) which are directed onto specific optical synapse devices 200. The devices without green, blue or UV light annotations positioned over them are under dark conditions where no light shines on them.

In one example, lasers with different light wavelengths are employed to change the conductance of the optical synapse device 200. The optical synapse device exhibits different sensitivity to the photons with different wavelengths. Different conductance modulation is induced corresponding to 1.9 $G^D$, 2.4 $G^D$, and 3.6 $G^D$ by the illumination of green light, blue light, and UV light respectively, where $G^D$ means the conductance under a dark condition.

As shown in FIG. 19, each column of optical synapse devices 200 generates a current, which are labelled $I_1^+$, $I_2^-$, $I_3^+$, $I_4^-$, $I_5^+$, $I_6^-$, $I_7^+$, $I_8^-$, $2I_9^-$, $I_{10}^+$, $I_{11}^-$. Each kernel has its own operating circuit 312 for processing the aggregated currents from at least two of the current lines. These operating circuits 312 can be configured to execute any type of operation upon the received current. In the example of FIG. 19, the operating circuits 312 of kernels 302, 304 and 306 subtract one current from another. In kernel 308, the operating circuit 312 is configured to execute a different operation of $I_7^+ + I_8^- - 2I_{10}^+ + I_{10}^+ - I_{10}^+$. The final current value from each operating circuit 312 is stored in a memory database 314, mapped to a specific pixel location in the filtered image that corresponds to the same pixel location from the original image. Software based post-processing can be used to transform these current signals into corresponding pixel values for reconstruction of the filtered image. To build up the database 313, the relationship among the pixel, voltage, and current is identified. The memory database 314 can be part of or separate from the convolution processor 300. In short, the convolution processor 300 of FIG. 19 executes a dot product calculation between all the kernels 302, 304, 306, 308 and the pixel values of the sub-image 310.

A significant advantage of the hardware-based convolution processor 300 is the reduction in energy consumption versus a traditional software based approach. For example, filtered/processed images are read out directly without frequent data transmission in traditional software-based systems. This is very advantageous for remote applications like autonomous vehicles where the bulk of the processing must be done outside of the vehicle itself. Hence there is also shorter time delay for obtaining the processed image in a fully integrated system (multichip multi-board etc.), rather than having to transmit data back and forth to a central processing location (i.e. the cloud).

Figure 20:
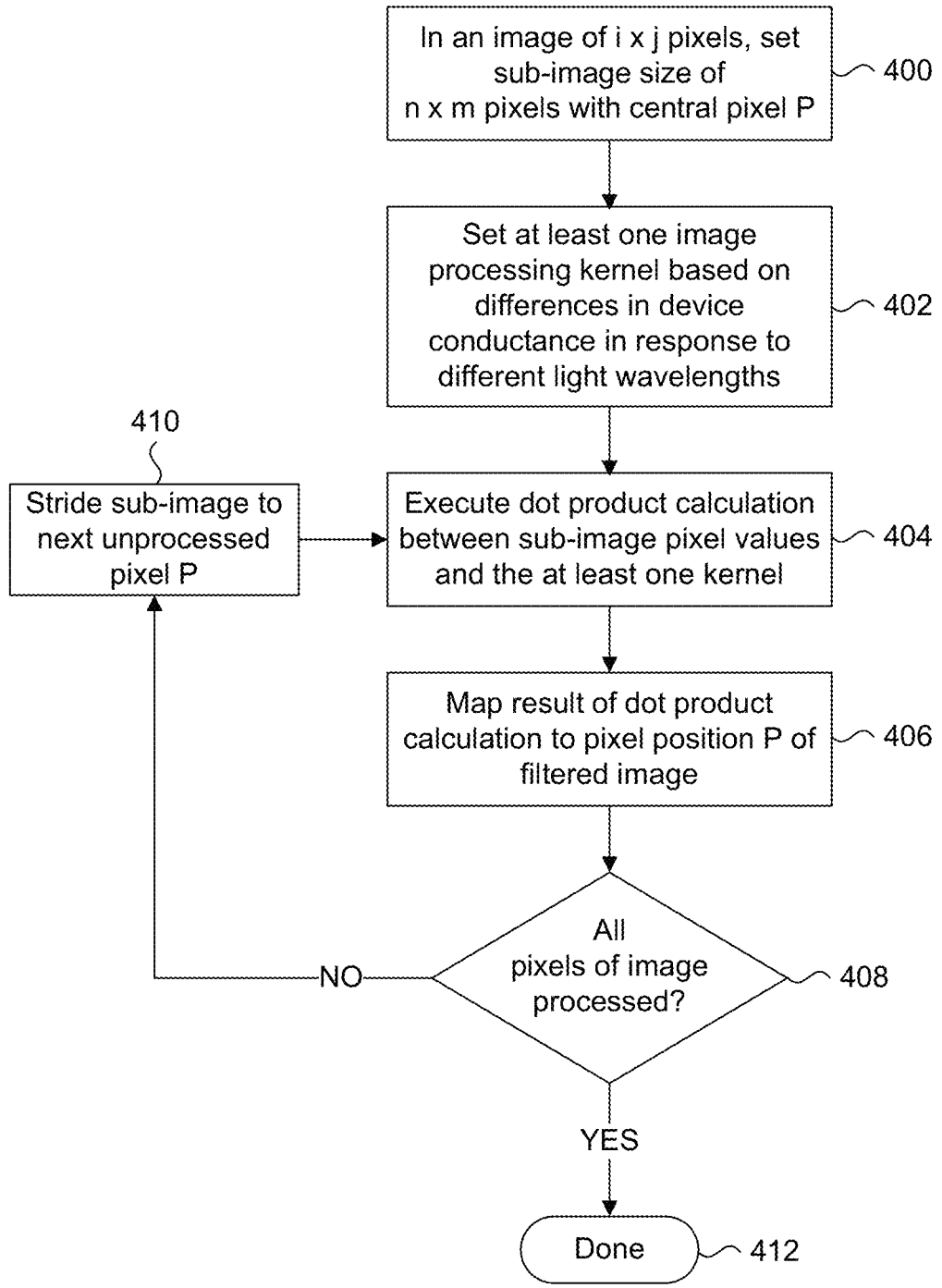
FIG. 20 is a flowchart of a method cooperation of the convolution processor of FIG. 19, according to a present embodiment.

The operation of the convolution processor 300 is summarized with reference to the flowchart of FIG. 20. It is assumed that an original image captured by optical sensor, such as optical sensor 102 of FIG. 2, has been converted to grayscale with corresponding pixel intensity values normalized into voltages for application to the convolution processor 300. Assuming that the grayscale image is i×j pixels, the first step 400 is to set the sub-image size of n×m pixels, where both n and m are less than i and j respectively. In the example of FIG. 17, the grayscale image is 5×5 pixels with the sub-image being 3×3 pixels.

Then at step 402, at least one image processing kernel is set with weights based on differences in conductance of the described optical synapse device in response to at least two different light wavelengths. This can be any one or more of the image processing kernel configurations shown in FIG. 18. This setting of the at least one image processing kernel is embodied by the crossbar array shown in FIG. 19 with the light sources arranged to emit light of specific wavelengths onto predetermined optical synapse devices that form the crossbar array.

From a starting pixel of the image, the dot product calculation between the corresponding sub-image and the at least one image processing kernel is executed at step 404. This is the application of the pixel intensity values (voltages) V1-V9 applied to the voltage lines of the crossbar array of FIG. 19 with the light sources activated. The resulting dot product calculation, which is a current in the present embodiments, is stored and mapped to the same pixel position and a resulting filtered image at step 406.

Given that the system tracks which pixel of the image has been processed, a determination is made at step 408 to see if all the pixels of the image have been processed. If not, then the method proceeds to step 410 where the pixel coordinates of the sub-image are shifted to the next un-processed pixel before the dot product calculation is executed again at step 404. The method iteratively executes steps 404, 406, 408 and 410 until all of the pixels of the image have been processed, at which point the method ends at step 412.

The effectiveness of the hardware based convolution processor 300 was tested and compared to traditional software-based convolution image processing of the same image. In arithmetical processing with software, the kernel values were ideally equal to designed values with a device-variation-free condition. A negligible difference was observed between the results of the software based processing versus the hardware based convolution processor 300. Hardware-processed images were almost the same as the software counterparts, which demonstrated the tolerable device variance for convolution image processing.

The resulting filtered image from the convolution processor 300 can now be used as input for further post processing. In the presently described embodiments, the resulting filtered image can be subjected to post processing by the neuromorphic processor 106 of FIG. 2 for cognitive object recognition by example. According to a present embodiment, the optical synaptic device of the present embodiments can also be used in the neuromorphic processor 106 of FIG. 2.

Figure 21:
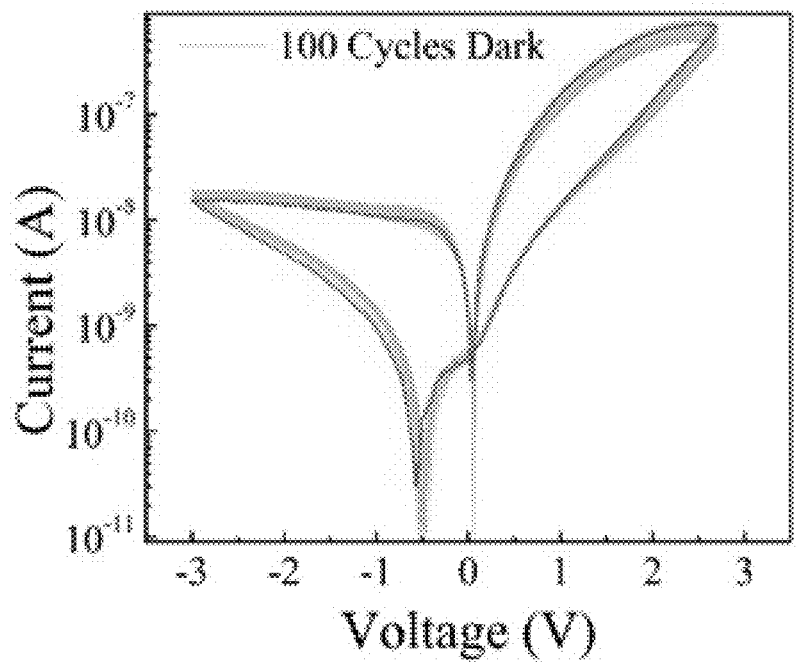
FIG. 21 is a plot showing I-V curves of electrical resistive switching for 100 cycles.
Figure 22:
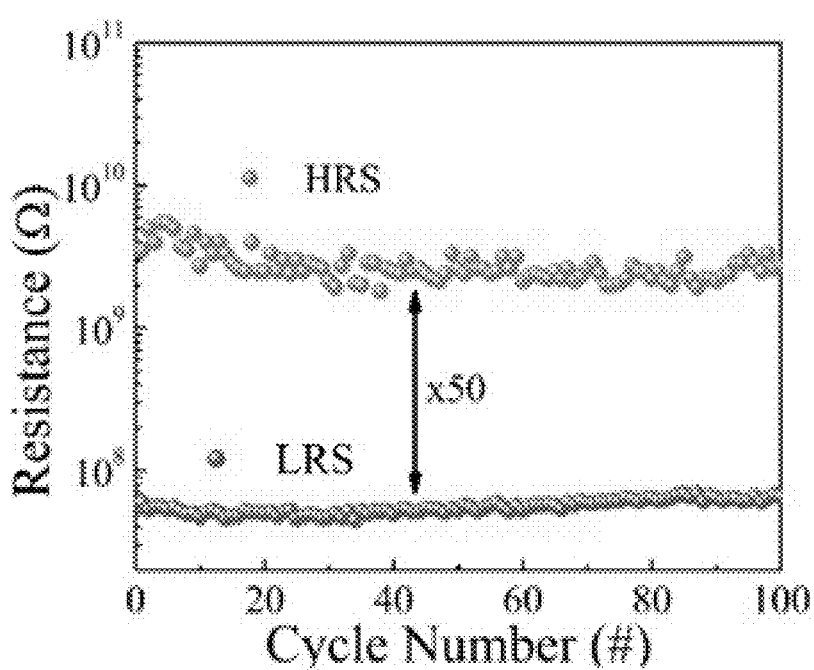
FIG. 22 is a plot showing the distribution of HRS and LRS over 100 operation cycles.

The optical synaptic device of the present embodiments shows reliable synaptic performance under electronic operations. In testing, the typical memristive resistive switching was measured, and no degradation was observed over 100 cycles as shown in the I-V curve plot of FIG. 21. A non-zero-crossing hysteresis loop was observed, which was due to parasitic capacitance. The HRS and LRS distributions over multiple operations are shown in FIG. 22. A small variation was observed, demonstrating good robustness.

Figure 23:
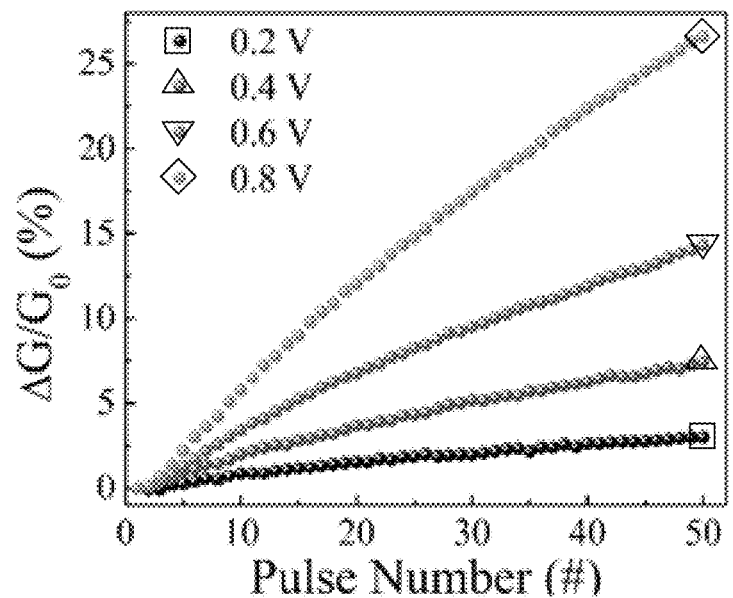
FIG. 23 is a plot showing potential performances depending on the input electronic amplitudes.

To mimic biological synaptic behaviours, 50 consecutive pulses with various voltage amplitudes were applied to the optical synapse device of the present embodiments. FIG. 23 plots different stimulation voltages over 50 pulses. $G_0$ represents the initial conductance of the device. $\Delta G$ represents the change of the conductance after the electronic pulses were applied to the device. Stronger plasticity was found when higher voltages were utilized, which mimicked SADP in biological individuals. When the stimulation was weak, for example, 0.2 V, the conductance change margin was very narrow (~2%). Instead, the $\Delta G/G_0$ was over 25% when the higher voltage of 0.8 V was applied to stimulate the device.

Figure 24:
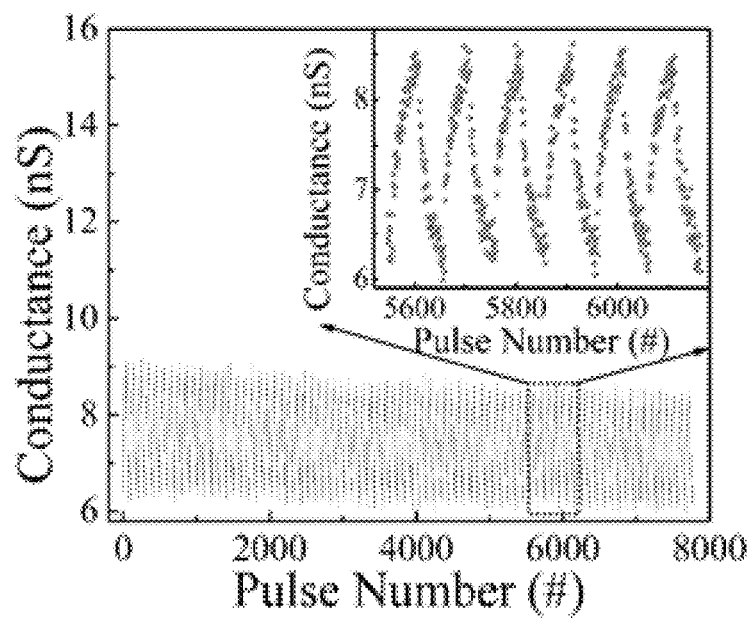
FIG. 24 is a plot showing potential/depression performances under positive/negative electronic pulses; and, FIG. 25 is a plot showing retention time of different states under different pulse numbers.

Furthermore, potentiation and depression performances were observed as shown in the plot of conductance versus pulse number in FIG. 24. The conductance of the device increased continually as consecutive positive pulses were applied. The pulse (square wave) duration was identical to 100 ms, the voltage amplitude was 1V, and the duty cycle was 50%. In contrast, the continued decrease of conductance was observed when negative pulses were applied. This can mimic the synaptic potentiation and depression features in biological individuals.

Figure 25:
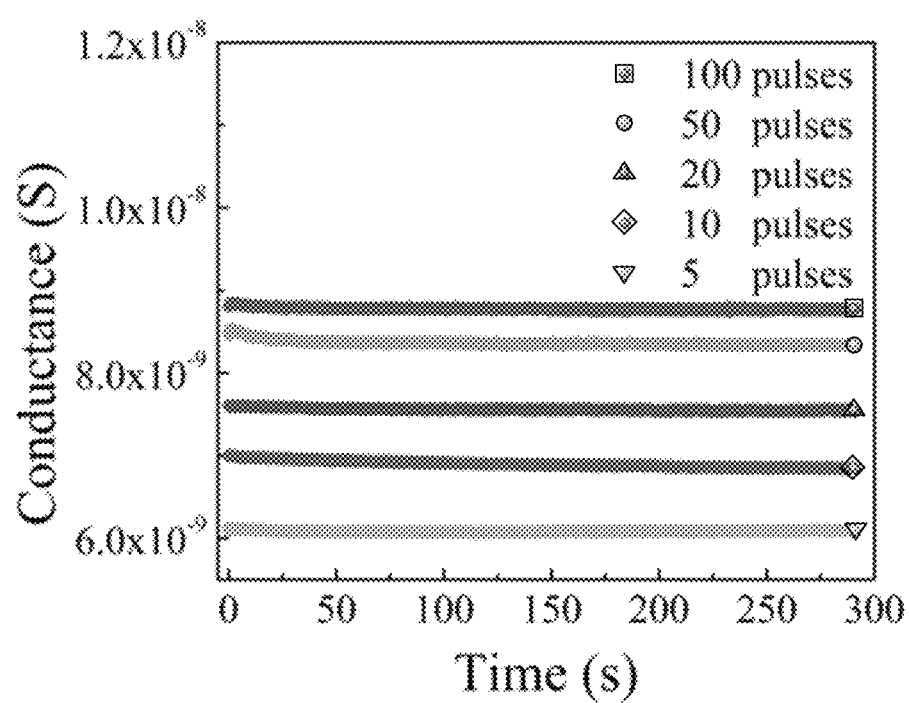

The retention performance is shown in FIG. 25, in which distinguishable states were observed after different pulse programs. This characterization can be utilized for neuromorphic computing. The statistics of the asymmetric non-linearity (ANL) factor over cycle-to-cycle operations were analysed, where the calculation method was based on work done by C. Chang, P. Chen, T. Chou, I. Wang, B. Hudec, C. Chang, C. Tsai, T. Chang, T. Hou, IEEE Journal on Emerging and Selected Topics in Circuits and Systems 2018, 8, 116. The small ANL average factor of 0.6 and standard deviation of 0.2 were obtained in the optoelectronic device, which benefited the high computing accuracy of neuromorphic computing. The device-to-device variation is very important for memory and computing based on memristive arrays.

The statistical mapping of device-to-device variations in a 6×6 array was conducted, and with distinctive HRS and LRS being obtained in the integrated device array. The statistics of device-to-device variation were analysed by fitting with the Gaussian Function. The values of $\sigma/(\mu*r)$ HRS and LRS was 0.7% and 3.4% respectively, where Ip is the expected value, $\sigma$ is the standard deviation, and r is the ratio of HRS/LRS. The results demonstrated small variations over the whole array, which is crucial for the computing accuracy based on the device. The device can be integrated into a high-density array, such as a crossbar array or stacked three-dimensional (3D) array, for implementing matrix-vector multiplication (MVM).

Weights in neural networks were stored locally as device conductance during computing. By utilizing Ohm's law and Kirchhoff's current law, the results of MVM considered a core computing task in deep learning algorithms can be obtained by measuring currents. This methodology realizes parallelism calculations as one current measurement is required regardless of the array size (corresponding to the matrix size in deep learning), which is energy-efficient compared to that of traditional digital computing systems. Neuromorphic computing for handwritten recognition was implemented. A three-layer neural network consisting of the input layer (784 neurons), hidden layer (300 neurons), and output layer (10 neurons) was built up. The backpropagation algorithm was employed to train the neural network. After merely three integrations, the recognition accuracy reached 90%.

Accordingly, the broadband two-terminal optical synapse device described in the present embodiments can be utilized for front-end retinomorphic image sensing, convolution processing, and back-end neuromorphic computing. Unlike a traditional von Neumann configuration system, data does not need to be shuttled between units thereby realizing high-speed processing and low energy consumption.

In the previously described embodiments, specific wavelengths for the green, blue and UV light are mentioned for use with the optical synapse device embodiments, and are considered examples which have been tested. In alternate embodiments, any specific wavelength in the range for green, blue and UV light can be used.

In other words, an embodiment of the machine vision system 100 of FIG. 2 can have the optical sensor 102, the convolution processor 104 and the neuromorphic processor 106 constructed with the presently described broadband two-terminal optical synapse device.

In one embodiment, the machine vision system 100 shown in FIG. 2 can be implemented with the convolution processor 104 configured as the convolution processor 300 embodiment of FIG. 19 while the optical sensor 102 and/or the neuromorphic processor 106 can be implemented with any other type of hardware technology. In other words, any optical sensor 102 can be configured to provide the required pixel intensity values convolution processor 300. Similarly, any suitably configured neuromorphic processor 106 can be used to receive the current outputs of convolution processor 300.

Unless defined otherwise, all technical and scientific terms used herein have the same meaning as commonly understood by one of ordinary skill in the art to which this invention belongs.

As used herein, the term "about" refers to an approximately +/−10% variation from a given value. It is to be understood that such a variation is always included in any given value provided herein, whether or not it is specifically referred to.

The term "plurality" as used herein means more than one, for example, two or more, three or more, four or more, and the like.

The use of the word "a" or "an" when used herein in conjunction with the term "comprising" may mean "one", but it is also consistent with the meaning of "one or more", "at least one", and "one or more than one".

As used herein, the terms "comprising", "having", "including", and "containing", and grammatical variations thereof, are inclusive or open-ended and do not exclude additional, unrecited elements and/or method steps. The term "consisting essentially of" when used herein in connection with an apparatus, system, composition, use or method, denotes that additional elements and/or method steps may be present, but that these additions do not materially affect the manner in which the recited apparatus, system composition, method or use functions. The term "consisting of" when used herein in connection with an apparatus, system, composition, use or method, excludes the presence of additional elements and/or method steps. An apparatus, system composition, use or method described herein as comprising certain elements and/or steps may also, in certain embodiments consist essentially of those elements and/or steps, and in other embodiments consist of those elements and/or steps, whether or not these embodiments are specifically referred to.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. An optical synapse device formed on a substrate, comprising:
   a transparent electrically conductive film electrode configured to receive a voltage as an input;
   a double oxide active layer having resistive switching properties adjacent to and receiving light passed through the electrically conductive film electrode and configured to generate a current in response to the voltage and light passed through the electrically conductive film electrode; and
   an electrically conductive layer interposed between the double oxide active layer and the substrate to provide the current as an output.

2. The optical synapse device of claim 1, wherein the electrically conductive film electrode has at least 80% transmittance to light with a wavelength greater than 390 nm.

3. The optical synapse device of claim 2, wherein the electrically conductive film electrode is formed of indium tin oxide (ITO).

4. The optical synapse device of claim 1, wherein the double oxide active layer is sensitive to light of any wavelength below 620 nm.

5. The optical synapse device of claim 1, wherein the double oxide active layer is sensitive to green light.

6. The optical synapse device of claim 4, wherein the double oxide active layer is further sensitive to blue light.

7. The optical synapse device of claim 5, wherein the double oxide active layer is further sensitive to ultraviolet (UV) light.

8. The optical synapse device of claim 6, wherein the double oxide active layer includes
   a zinc oxide (ZnO) layer adjacent to the electrically conductive film electrode, and
   a molybdenum trioxide ($MoO_3$) layer adjacent to the ZnO layer.

9. The optical synapse device of claim 8, wherein the ZnO layer is configured to have a band gap between 3.10 eV to 3.44 eV.

10. The optical synapse device of claim 8, wherein the $MoO_3$ layer is configured to have a band gap between 3.16 eV to 3.9 eV.

11. A convolution processor, comprising
    a plurality of optical synapse devices of claim 1 arranged in rows and columns, where each row of optical synapse devices is coupled to a respective voltage line that receives an input voltage, and each column of optical synapse devices is coupled to a respective current line that receives an aggregated current generated from the corresponding optical synapse devices in response to the input voltage and one of, at least one specific wavelength of light, or no light;
    at least one light source configured to generate and direct the at least one specific wavelength of light onto predetermined optical synapse devices, the at least one specific wavelength of light modulating a transconductance of the optical synapse device to be different from the transconductance of the optical synapse device that receives no light; and
    an operating circuit for processing the aggregated currents from at least two of the current lines according to a predetermined operation to provide a final current output.

12. The convolution processor of claim 11, wherein each of the input voltages corresponds to a pixel intensity value received from an optical sensor.

13. The convolution processor of claim 12, wherein the plurality of optical synapse devices are arranged in 9 rows, and the input voltages correspond to pixel positions of a sub-image 3×3 pixels in size.

14. The convolution processor of claim 13, wherein a first and a second column of the optical synapse devices include light sources generating and directing green light onto specific optical synapse devices to execute one of a blurring edge, vertical edge detection and horizontal edge detection image processing kernels, with predetermined optical synapse devices receiving no light.

15. The convolution processor of claim 13, wherein a first, a second, a third, a fourth and a fifth column of the optical synapse devices include light sources generating and directing green, blue and ultraviolet (UV) light onto specific optical synapse devices to execute a sharpening edge image processing kernel, with predetermined optical synapse devices receiving no light.

16. A method for convolution processing an image consisting of i×j pixels, where i and j are integer values, to generate a filtered image consisting of i×j pixels, comprising:
   a) setting an input sub-image size of n×m pixels having a central pixel position P, where n and m are integer values, n is less than i and m is less than j;
   b) setting at least one image processing kernel configured with weights corresponding to each of the n×m pixel positions, where each weight is predetermined by differences in transconductance of the optical synapse device of claim 1 in response to at least two different light wavelengths;
   c) executing a dot product calculation between the pixel values of the sub-image and the at least one image processing kernel;
   d) mapping the dot product calculation result to pixel position P of the filtered image; and,
   e) iteratively repeating steps c) and d for all pixels of the image.

17. The method of claim 16, wherein the at least one image processing kernel includes blurring edge, vertical edge detection and horizontal edge detection image processing kernels, and the at least two different light wavelengths correspond to green light and no light.

18. The method of claim 16, wherein the at least one image processing kernel includes a sharpening edge image processing kernel, and the at least two different light wavelengths correspond to green light, blue light, ultraviolet light and no light.

19. A method for fabricating an optical synapse device of claim 1, comprising:
   depositing the electrically conductive layer on the substrate;
   forming the double oxide active layer on the electrically conductive layer; and
   depositing the transparent electrically conductive film electrode over the double oxide active layer.

20. The method of claim 19, wherein forming the double oxide active layer includes depositing a molybdenum trioxide ($MoO_3$) layer on the electrically conductive layer and depositing a zinc oxide (ZnO) layer on the $MoO_3$ layer.

21. The method of claim 20, further including at least one additional fabrication step to increase an oxygen vacancy level of the double oxide active layer.

* * * * *